(12) United States Patent
Koziol et al.

(10) Patent No.: US 9,517,753 B2
(45) Date of Patent: Dec. 13, 2016

(54) MANUAL BRAKE RELEASE MECHANISM FOR RAIL VEHICLES

(71) Applicant: WABTEC HOLDING CORP., Wilmerding, PA (US)

(72) Inventors: Michael Koziol, Berwyn, IL (US); Richard Wayne Plegge, Palatine, IL (US); Peter Paul Gregar, Chesterton, IN (US)

(73) Assignee: Wabtec Holding Corp., Wilmerding, PA (US)

( * ) Notice: Subject to any disclaimer, the term of this patent is extended or adjusted under 35 U.S.C. 154(b) by 25 days.

(21) Appl. No.: 14/503,850

(22) Filed: Oct. 1, 2014

(65) Prior Publication Data

US 2015/0090064 A1    Apr. 2, 2015

Related U.S. Application Data

(60) Provisional application No. 61/885,599, filed on Oct. 2, 2013.

(51) Int. Cl.
| | |
|---|---|
| *B61H 13/04* | (2006.01) |
| *B60T 7/10* | (2006.01) |
| *F16C 33/58* | (2006.01) |
| *B60T 17/22* | (2006.01) |
| *F16C 27/08* | (2006.01) |

(52) U.S. Cl.
CPC .............. *B60T 7/104* (2013.01); *B60T 17/228* (2013.01); *B61H 13/04* (2013.01); *F16C 27/08* (2013.01); *F16C 33/585* (2013.01); *Y10T 74/2039* (2015.01)

(58) Field of Classification Search
CPC .......... B60T 7/104; B60T 17/228; G05G 1/04; G05G 11/00; B61H 13/04; F16D 2125/62; Y10T 74/2039
USPC ........................................................ 188/2 D
See application file for complete search history.

(56) References Cited

U.S. PATENT DOCUMENTS

| | | | |
|---|---|---|---|
| 3,997,030 A | * | 12/1976 | Yoshigai ................... B62L 1/12 188/196 BA |
| 6,241,057 B1 | | 6/2001 | Hiatt |
| 6,378,668 B1 | | 4/2002 | Zemyan et al. |
| 6,491,352 B2 | | 12/2002 | Engle |
| 6,761,253 B1 | | 7/2004 | Kanjo et al. |
| 6,854,570 B2 | | 2/2005 | Connell |
| 7,140,477 B2 | | 11/2006 | Engle et al. |
| 7,404,473 B2 | | 7/2008 | Engle |
| 8,006,815 B2 | | 8/2011 | Sommerfeld et al. |
| 8,033,533 B2 | | 10/2011 | Ring et al. |
| 8,230,985 B2 | | 7/2012 | Sommerfeld et al. |

(Continued)

FOREIGN PATENT DOCUMENTS

WO    2009007682 A1    1/2009

*Primary Examiner* — Xuan Lan Nguyen
(74) *Attorney, Agent, or Firm* — The Webb Law Firm

(57) ABSTRACT

A spring-biased lever arm mechanism for operating an operating lever of a parking brake release mechanism. The lever arm mechanism includes a lever arm mounted on a pivot pin, a torsion spring disposed on the pivot pin, and first and second cable release mechanism. A manually operated parking brake release mechanism is also provided for a railway vehicle including a brake actuator, an operating lever associated with the brake actuator to manually release an applied braking force, and the spring-biased lever arm mechanism for operating the operating lever.

19 Claims, 20 Drawing Sheets

(56) References Cited

U.S. PATENT DOCUMENTS 8,256,584 B2    9/2012   Sommerfeld et al.
8,469,464 B2    6/2013   Sommerfeld et al.
8,556,044 B2   10/2013   Marlow et al.

* cited by examiner

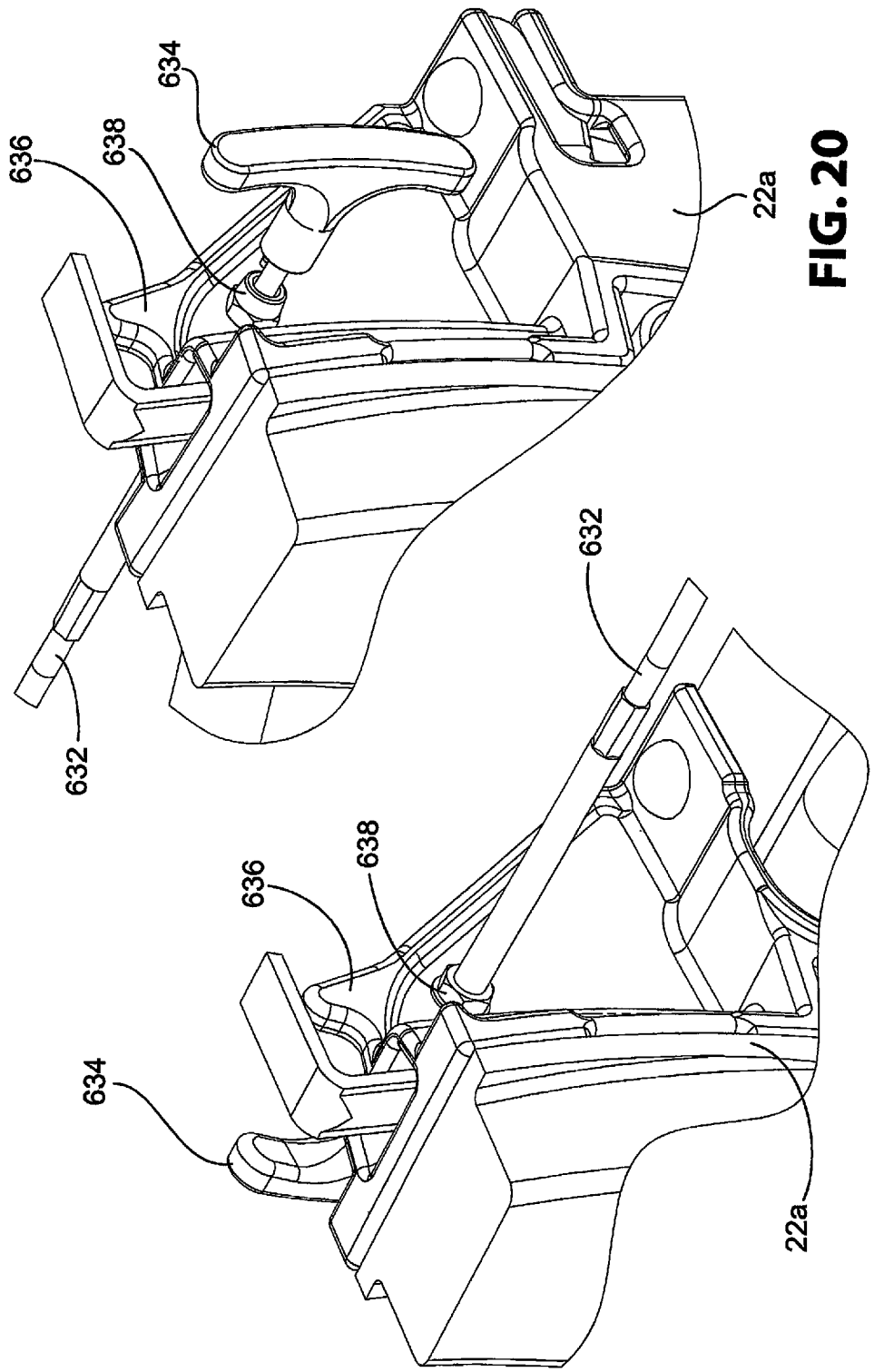

MANUAL BRAKE RELEASE MECHANISM FOR RAIL VEHICLES

CROSS REFERENCE TO APPLICATIONS

This application claims priority to U.S. Provisional Application No. 61/885,599, filed Oct. 2, 2013, and incorporates by reference U.S. Pat. Nos. 8,256,584; 8,230,985; and 8,006,815; all to Sommerfeld et al.

BACKGROUND OF THE INVENTION

1. Field of the Invention

The present disclosure relates, in general, to railway vehicle braking systems and, more particularly, relates to a parking brake assembly for use in a railway vehicle braking system and, further, relates to a parking brake assembly for use in a railway vehicle truck mounted brake rigging and, further, relates to a manual parking brake release mechanism for use with a railway vehicle parking brake assembly. The present disclosure further relates to embodiments of a bail compensation joint or arrangement provided as part of a brake actuator for the parking brake assembly.

2. Description of Related Art

As is generally well known in the railway industry, the brake system used on the railway cars employs a plurality of force transmitting members to convert supply of the pneumatic fluid pressure from the brake pipe into a mechanical force to apply and bias one or more brake shoes against the tread of one or more wheels of the railway car.

When a single railway car or a plurality of railway cars are parked at a siding, or yard, the hand brake or parking brake on at least some of these railways cars is applied as a precaution against unwanted or unexpected movement of the cars. A typical railway car hand brake system normally consists of an apparatus for manually applying and biasing one or more brake shoes against the tread of one or more wheels of the railway car by either turning a hand wheel or pumping a ratchet handle on a hand brake mechanism attached to the railway car. However, it has been known for an operator to improperly apply the hand brake causing undesirable movement of the railway cars.

Furthermore, during an emergency brake application or during loss of the fluid pressure in the brake pipe due to rupture or disconnection, it is necessary to apply and maintain brakes until the supply of the fluid pressure can be restored.

Numerous attempts have been made to alleviate the operational problems related to parking individual railway cars. U.S. Pat. No. 7,140,477 issued to Engle et al.; U.S. Pat. No. 6,854,570 issued to Connell; U.S. Pat. No. 6,761,253 issued to Kanjo et al.; and U.S. Pat. No. 6,491,352 issued to Engle describe various constructions of parking brake assemblies, each incorporated herein by reference.

SUMMARY OF THE INVENTION

In one embodiment, a bail compensating joint comprises a threaded push rod, a ratchet associated with the push rod for rotational motion thereon, and a helical joint comprising a pair of bearings mounted on the ratchet for facilitating rotation of the ratchet. The helical joint may further comprise a first bearing and a second bearing. The first bearing is supported by an annular inner race member and an annular outer race member. The annular inner race member has a first side seated against the ratchet and an opposing second side defining a race track for ball bearings of the first bearing. The annular outer race member has a first side engaged with the ball bearings of the first bearing, the first side can have a shape, such as a tapered annular surface, configured to permit angular movement of the helical joint. The second bearing is supported by an annular composite race member formed by an annular inner race member joined with an annular outer member. The composite race member supports the second bearing with the annular inner race member thereof engaging the second bearing and defining a race track for ball bearings of the second bearing, and the annular outer member of the composite race member formed of a resiliently deformable material. The annular inner race member of the composite race member may be metal and the annular outer member of the composite race member may be rubber joined adhesively to the metal. According to one design, the push rod can comprise a solid one-piece threaded member and the ratchet can be threadedly connected to the push rod.

In another embodiment, a bail compensating joint comprises a push rod, a ratchet associated with the push rod for rotational motion thereon, and a helical joint comprising a pair of bearings comprising a first bearing and a second bearing mounted on opposing sides of the ratchet for facilitating rotation of the ratchet. The helical joint further comprises a pair of spherical joints disposed, respectively, on opposite sides of the ratchet, the spherical joints supporting the respective bearings. A first spherical joint of the pair of spherical joints supports the first bearing. The first bearing is supported by an annular inner race member and an annular outer race member. The annular inner race member has a first side seated against the ratchet and a second side seated against the first bearing. The annular outer race member has a first side seated against the first bearing and a second side defining a first shaped or concave-shaped surface, the concave surface engaged with a second shaped or convex-shaped surface of an annular outer member. The second shaped surface is complementary to the first shaped surface. A second spherical joint of the pair of spherical joints supports the second bearing. The second bearing is supported by an annular inner race member and an annular outer race member. The annular inner race member of the second spherical joint has a first side seated against the ratchet and a second side seated against the second bearing. The annular outer race member of the second spherical joint has a first side seated against the second bearing and a second side defining a third shaped or convex-shaped surface, the convex-shaped surface engaged with a fourth shaped or concave-shaped surface on an annular outer member of the second spherical joint. The third and fourth shaped surfaces are complementary to each other. The annular outer race and the annular outer members can be associated with one another in a male-female relationship and the second spherical joint can be a mirror image of the first spherical joint. According to one design, the push rod can comprise a solid one-piece threaded member and the ratchet can be threadedly connected to the push rod.

The second side of the annular inner race member of the first spherical joint may define a race track for ball bearings of the first bearing. The first side of the annular outer race member of the first spherical joint may define a race track for ball bearings of the first bearing. The annular outer member of the first spherical joint may have a first side defining the convex-shaped surface and a second, planar side.

The second side of the annular inner race member of the second spherical joint may define a race track for ball bearings of the second bearing. The first side of the annular outer race member of the second spherical joint may define a race track for ball bearings of the second bearing. The annular outer member of the second spherical joint may have a first side defining the concave-shaped surface and a second, planar side.

According to another aspect, a bail compensating joint comprises a solid one-piece threaded push rod, a ratchet in threaded connection with the push rod for rotational motion thereon, and a helical joint comprising a first bearing and a second bearing mounted on the ratchet for facilitating rotation of the ratchet. At least one spherical joint supports at least one of the first bearing and the second bearing. The at least one spherical joint includes a surface engaged with ball bearings of the at least one of the first bearing and the second bearing wherein the at least one spherical joint is configured to permit angular movement of the helical joint.

According to one embodiment, an annular composite race member supports the opposite of the first bearing and second bearing supported by the at least one spherical joint, and the annular composite race member includes an annular inner race member and an annular outer member formed of a resiliently deformable material.

According to another embodiment, the at least one spherical joint comprises a first spherical joint for supporting the first bearing and a second spherical joint for supporting the second bearing, and wherein each of the first and second spherical joints have an annular inner race member having a first side seated against respective ball bearings and a second side including a shaped surface configured for mating with a respective complementary shaped annular outer members. The second side of the annular inner race member of the first and second spherical joints can form a male-female engagement with the annular outer members and the second spherical joint can be a mirror image of the first spherical joint.

In another embodiment, a spring-biased lever arm mechanism for operating an operating lever of a parking brake release mechanism is provided. The lever arm mechanism comprises a lever arm pivotal on a pivot pin. The lever arm comprises a front appendage portion to engage the operating lever, a rear appendage portion, and a notch defined in one side of the lever arm between notch elements. A torsion spring is disposed on the pivot pin. A first cable release mechanism comprises a first release cable having one terminal end with a first operator handle connected thereto and an opposing terminal end connected to the lever arm proximal of the front appendage portion. A second release mechanism comprises a second release cable having one terminal end with a second operator handle connected thereto and an opposing terminal end connected to the rear appendage portion of the lever arm. In use, pulling of the first operator handle or the second operator handle causes pivotal movement of the lever arm on the pivot pin and stores energy in the torsion spring, and release of the first operator handle or the second operator handle automatically returns the lever arm to a neutral position.

The pivot pin may be mounted on a mounting plate. A limit pin may be mounted on the mounting plate, and the torsion spring may comprise a terminal coil element in interference engagement with the limit pin. The limit pin may be disposed within the notch in the lever arm and the notch elements limit rotational motion of the lever arm.

Another embodiment is directed to a manually operated parking brake release mechanism for a railway vehicle, which comprises a brake actuator, an operating lever operatively connected to the brake actuator to manually release an applied braking force, and a spring-biased lever arm mechanism for operating the operating lever. The lever arm mechanism comprises a lever arm pivotal on a pivot pin. The lever arm comprises a front appendage portion to engage the operating lever, a rear appendage portion, and a notch defined in one side of the lever arm between notch elements. A torsion spring is disposed on the pivot pin. A first cable release mechanism comprises a first release cable having one terminal end with a first operator handle connected thereto and an opposing terminal end connected to the lever arm proximal of the front appendage portion. A second release mechanism comprises a second release cable having one terminal end with a second operator handle connected thereto and an opposing terminal end connected to the rear appendage portion of the lever arm. In use, pulling of the first operator handle or the second operator handle causes pivotal movement of the lever arm on the pivot pin and stores energy in the torsion spring, and release of the first operator handle or the second operator handle automatically returns the lever arm to a neutral position. Pivotal movement of the lever arm causes the operating lever to rotate between a first position and a second position wherein rotational movement of the lever arm results in a release of the applied braking force. Release of the first operator handle or the second operator handle enables stored energy in the torsion spring to return the lever arm to the neutral position and to cause the operating lever to rotate from the second position to the first position.

The pivot pin may be mounted on a mounting plate. A limit pin may be mounted on the mounting plate, and the torsion spring may comprise a terminal coil element in interference engagement with the limit pin. The limit pin may be disposed within the notch in the lever arm and the notch elements limit rotational motion of the lever arm.

Yet another embodiment is directed to a spring-biased lever arm mechanism for operating an operating lever of a parking brake release mechanism which includes a lever arm mounted on a pivot pin wherein the lever arm comprises a front appendage portion in engagement with the operating lever, a torsion spring disposed on the pivot pin, and at least one cable release mechanism associated with the lever arm proximal of the front appendage portion. Application of a pulling force to the at least one cable release mechanism causes pivotal movement of the lever arm on the pivot pin and stores energy in the torsion spring, and release of the at least one cable release mechanism automatically returns the lever arm to a neutral position.

The at least one cable release mechanism can include a release cable having one terminal end with a first operator handle connected thereto and an opposing terminal end connected to the lever arm proximal of the front appendage portion. The one terminal end of the release cable can be secured to the first operator handle and supported by an upstanding bracket secured to an upper face of a mounting plate and the opposing terminal end can be secured to the lever arm with a mechanical fastener. The lever arm can include a rear appendage portion and the at least one cable release mechanism can comprise a first cable release mechanism associated with the lever arm proximal of the front appendage portion and a second cable release mechanism associated with the rear appendage portion of the lever arm. The first cable release mechanism can include a first release cable having one terminal end with a first operator handle connected thereto and an opposing terminal end connected to the lever arm proximal of the front appendage portion and the second cable release mechanism can include a second release cable having one terminal end with a second operator handle connected thereto and an opposing terminal end connected to the rear appendage portion of the lever arm.

The application of the pulling force can be applied to either the first cable release mechanism or the second cable release mechanism to cause pivotal movement of the lever arm and manually release the parking brake.

The lever arm mechanism can also include a pair of notch elements defining a notch therebetween. The pivot pin can be mounted on a mounting plate and a limit pin can also be mounted on the mounting plate, disposed within the notch in the lever arm, such that the notch elements limit rotational motion of the lever arm. The torsion spring comprises a terminal coil element in interference engagement with the limit pin.

Further details and advantages will become apparent upon reviewing the detailed description set forth herein in connection with the accompanying drawings, wherein like parts are designated with like reference numerals throughout.

BRIEF DESCRIPTION OF THE DRAWINGS

FIG. 20 is a perspective view showing an operator handle to operate the manually operated brake release mechanism shown in FIGS. 18-19.

FIG. 21 is a perspective view showing an opposing side operator handle to operate the manually operated brake release mechanism shown in FIGS. 18-19.

DESCRIPTION OF THE INVENTION

Figure 1:
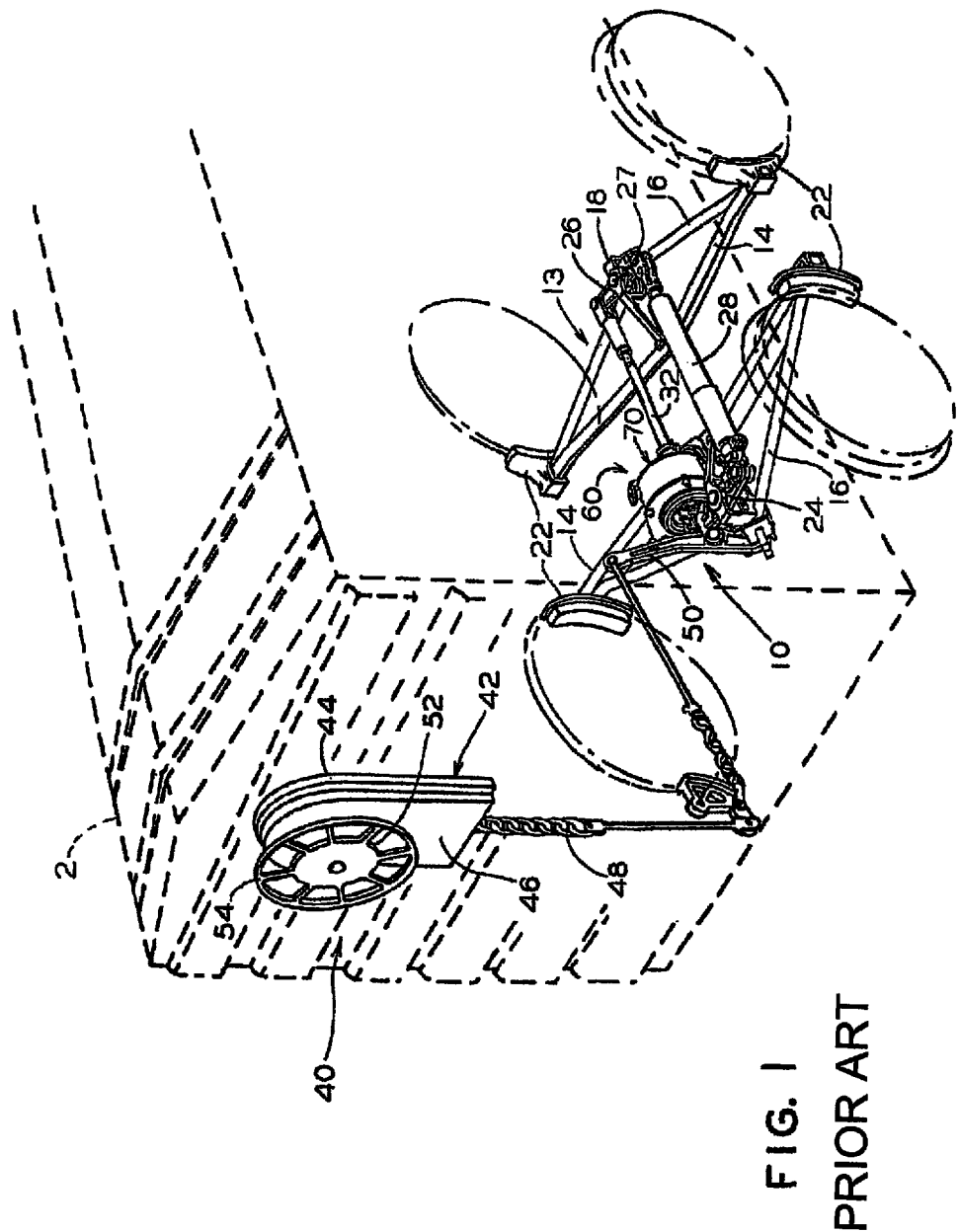
FIG. 1 is a perspective view of a truck-mounted brake rigging including a parking brake assembly with a conventional hand brake apparatus installed on a railway car shown in phantom.

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Referring to FIGS. 1-5 a truck-mounted brake rigging, generally designated 10, is shown for a railway car 2. The brake rigging 10 is installed within a conventional truck apparatus, generally designated as 3, carrying one end of the railway car body. Such truck apparatus 3 includes a pair of wheel sets 4 each having a pair of wheels 4a joined by an axle 4b and a frame 5 supported by the pair of wheel sets 4. The frame 5 includes a pair of side members 6a and 6b joined by a bolster 7.

The brake rigging 10 comprises brake beams, generally designated 12 and 13, which are substantially identical, each such brake beam including a compression member 14, a tension member 16 and a strut member 18. The opposite ends of the compression member 14 and the tension member 16 may be permanently connected together in a conventional manner. Mounted on the respective ends of the brake beams 12 and 13 are brake heads 22. At a location midway between their opposite ends, the compression member 14 and the tension member 16, of the respective brake beams 12 and 13, are spaced apart sufficiently to allow connection of the strut member 18 therebetween.

A pair of force-transfer levers 24 and 26 is pivotally connected by pins 27 to the strut member 18 of the respective brake beams 12 and 13. One end of the force-transfer levers 24 and 26 is interconnected via the force-transmitting member 28, which may be in the form of an automatic slack adjuster device. The opposite end of the respective force-transfer levers 24 and 26 is connected to the pressure head of the brake actuator, generally designated 70, via a force-transmitting member or a return push rod assembly 32.

Figure 10:
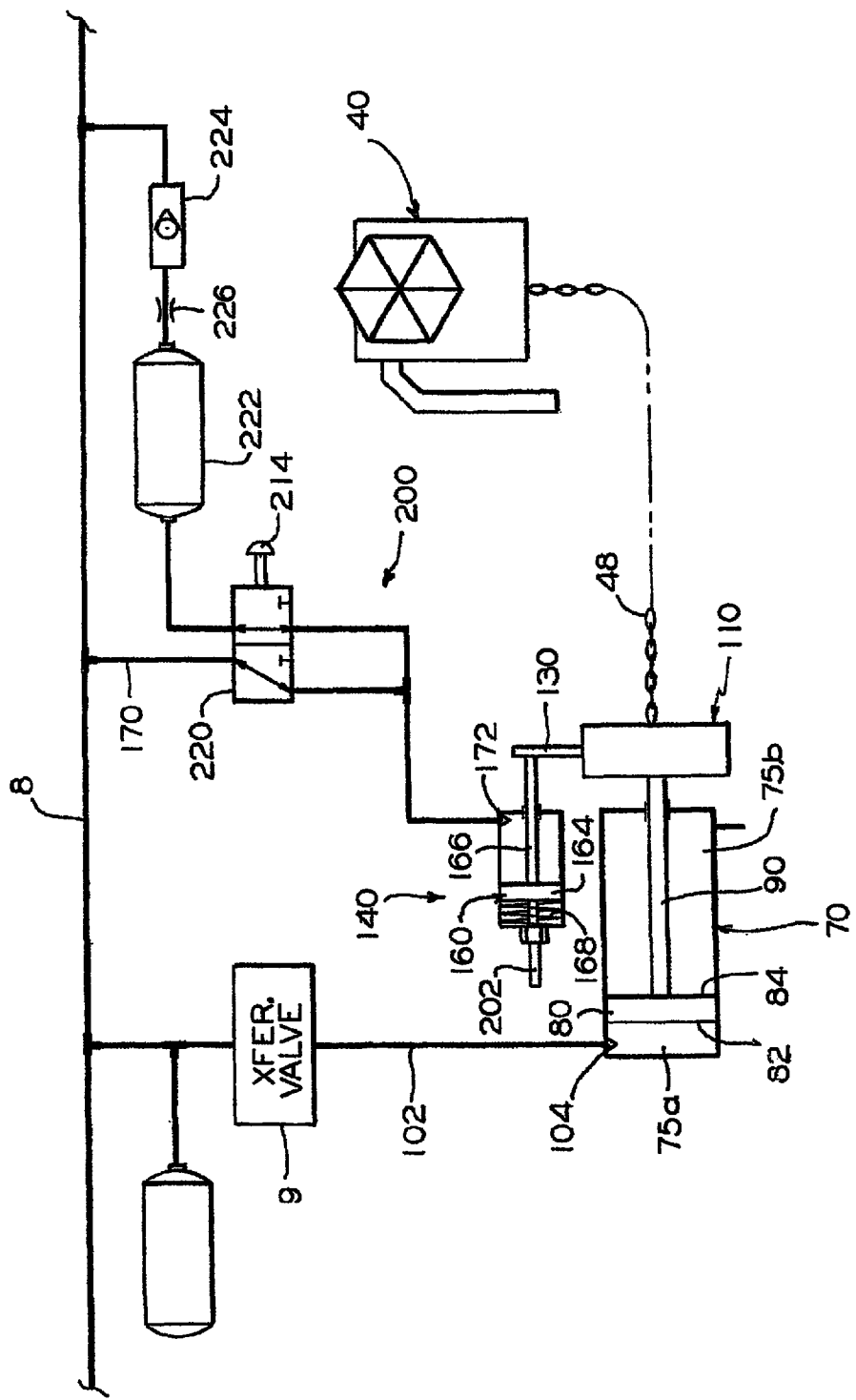
FIG. 10 is a schematic block diagram of the parking brake assembly, particularly illustrating a pneumatically operated manual release arrangement constructed according to another embodiment.
Figure 11:
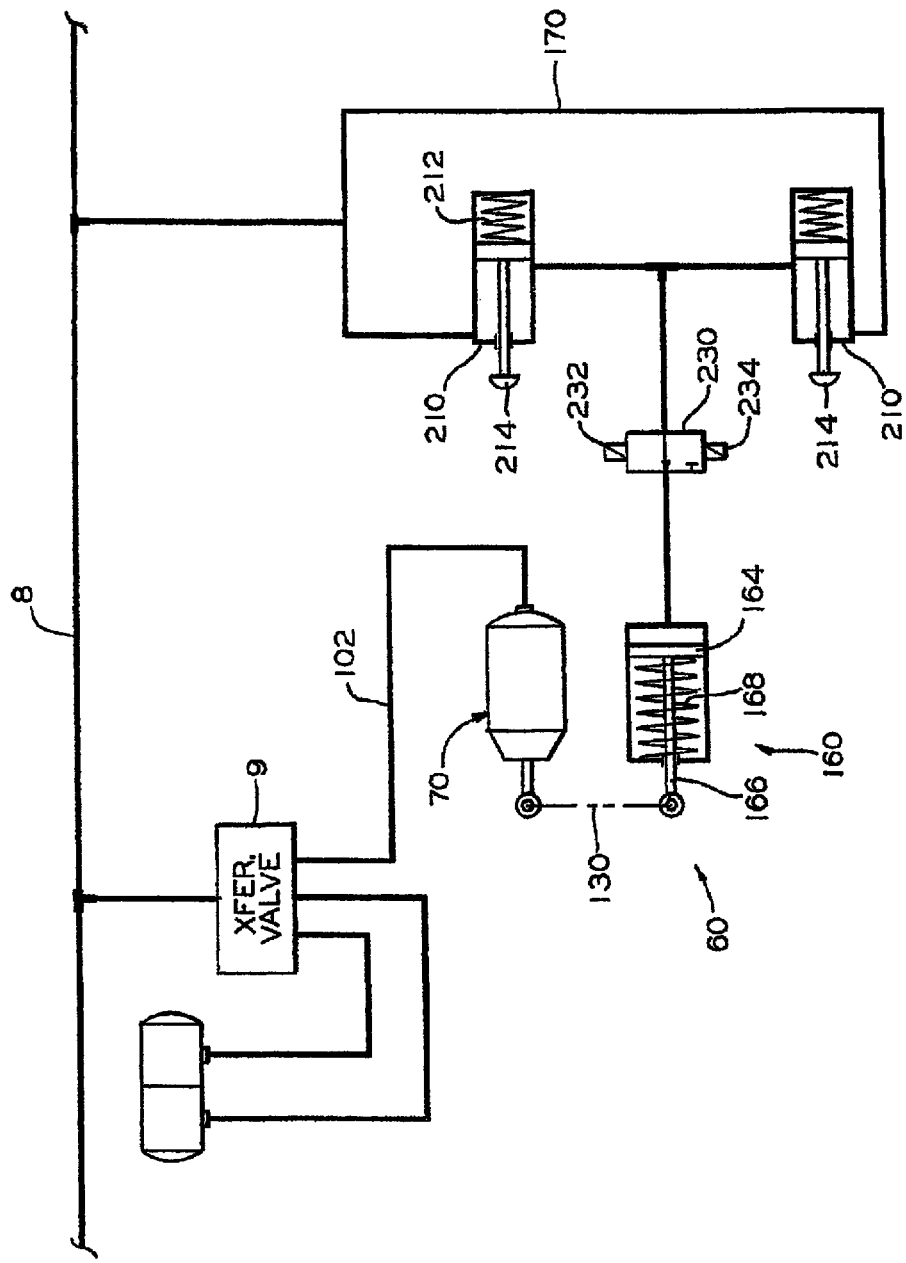
FIG. 11 is a schematic block diagram of the parking brake assembly, particularly illustrating a pneumatically operated manual release arrangement constructed according to another embodiment.

When a brake application is made, reduction of the fluid pressure in the brake pipe 8 causes, through a conventional transfer valve 9 shown in FIGS. 10-11, pressurization of the brake actuator 70 which results in movement of the brake actuator piston mounted within the housing thereof. This movement of the piston causes a spring, also mounted within the housing of the brake cylinder assembly, to compress, resulting in movement of a push rod 30, which is attached to the force transfer lever 24, in a first direction to effect counterclockwise rotation of the force-transfer lever 24. The force-transfer lever 24, in turn actuates the slack adjuster assembly 28 to effect counterclockwise rotation of the force-transfer lever 26 and consequent actuation of the return push rod assembly 32.

The force-transfer levers 24 and 26, along with the slack adjuster assembly 28, the return push rod assembly 32, and the brake actuator 70 comprise a brake beam actuating linkage that interconnects the brake beams 12 and 13 via pivot pins 27 and, thus, the required brake actuation forces effectively act along these pins 27. The resultant of these forces is shown at X in FIG. 3. Since the length of the slack adjuster assembly 28 increases with actuation of the brake actuator piston rod, it follows that brake beams 12 and 13 are moved apart by the brake beam linkage until the brake shoe engagement with the tread surface of the vehicle wheels 4a occurs. When the fluid pressure is evacuated from the brake actuator 70 due to the reduction of the fluid pressure in the brake pipe 8 and operation of the transfer valve 9, the push rod 30 moves in an opposed second direction causing the brake rigging 10 to release brakes.

During a parking situation when the railway cars 2 are taken out of the railway vehicle and parked, for example, at a siding or yard, the pneumatic braking system, as described above, can no longer be used. Thus, in order to apply the brake as a precaution against unwanted or unexpected movement of the cars, a hand brake mechanism, which is mounted on each car, can be employed.

In FIG. 1, a known, prior art hand brake mechanism, generally designated as 40, is shown. The hand brake mechanism 40 has a housing, generally designated as 42, which comprises a back plate or wall 44, mountable on a railway car 2, and a cover 46 which is secured to the back wall 44. A chain 48, for application or release of the brakes, is connected, as is conventional, to the brake rigging 10 via a hand brake lever 50 and wound on a winding drum 52. The hand brake lever 50 is, in turn, connected to the brake actuator transfer lever or force transfer lever 24.

In order to apply the brakes, a hand wheel 54 is rotated in a clockwise direction, as viewed in FIG. 1, to wind the chain 48 about the winding drum 52 and to cause the hand brake lever 50 to be pulled in an outward direction away from the brake rigging 10. This movement causes the force transfer lever 24 to be rotated in a counterclockwise direction resulting in the push rod 30 being pulled in an outward direction and the required force being applied to the slack adjuster assembly 28. This applied force is similar to the force which is applied by the brake actuator push rod 30 of the brake actuator 70 when such is pressurized. However, it has been found that operators may improperly apply the brakes or forget to apply brakes via the hand brake 40 causing unwanted movement of the railway car 2. Furthermore, application and release of the brakes via the hand brake 40 increases operating costs of the railway car 2 due to labor associated with operation of the hand brake 40. Additionally, unintentional and undesirable ruptures or disconnects within the brake pipe 8 or brake hose (not shown) can prevent operation of the brake rigging 10.

Now with reference to FIGS. 2-11, a known, prior art parking brake assembly, generally designated as 60, is shown and includes the brake actuator 70, which has a housing 72 mounted on the first brake beam 12 adjacent the pivotal connection of the first transfer lever 24. The housing 72 has a first end 73 and an opposed second end 74. The first end 73 is provided with mounting member 73a for stationary securing the brake actuator 70 onto the beam 12. As is conventional, the first end 73 of the housing 72 is closed, while the second end 74 is generally open. A fluid-pressure-operable piston assembly 80 is mounted for a longitudinal reciprocal motion within the housing 72. The piston assembly 80 divides the housing 72 into a pressurized portion 75a disposed intermediate the first end 73 of the housing 72 and the first end 82 of the piston 80 and a non-pressurized portion 75b disposed adjacent the second end 74 thereof. A piston rod 90 is secured at a first end 92 thereof to a second end 84 of the piston assembly 80. The piston rod 90 is capable of extending through the axial opening 76 in the second end 74 of the housing 72 responsive to the supply of fluid pressure into the pressurized portion 75a. The piston rod 90 is secured at a second end 94 thereof to a first end of the push rod 30, whereby the piston rod 90 and the piston assembly 80 move with the push rod 30 in the first and second directions.

Thus, in response to the supply of fluid pressure into the pressurized portion 75a of the housing 72, the piston assembly 80 moves in the first direction toward the second end 74 of the housing 72 causing the piston rod 90 and the push rod 30 to move in such first direction for increasing the length of the first force-transmitting means, to accordingly increase the spaced-apart distance between the first and second brake beams 12 and 13 respectively in order to apply a braking force.

A spring member 100 is disposed in the non-pressurized portion 75b of the housing 72 and is caged between an inner surface 77 of the second end 74 of the housing 72 and the second end 84 of the piston assembly 80. The spring member 100 is capable of exerting a force against the piston assembly 80 upon release of the spring member 100 responsive to evacuation of the fluid pressure from the pressurized portion 75a of the housing 72 causing longitudinal movement of the piston assembly 80 in the second direction within the housing 72 to accordingly retract the piston rod 90 therein. Accordingly, the push rod 30 will also move in the second direction and release the applied braking force.

A fluid communication means or device 102, including a conventional air pressure inlet 104, is also provided in fluid communication with the pressurized portion 75a of the housing 72 and with the brake pipe 8 for supplying the fluid pressure to the parking brake actuator 70 during brake application of the railway vehicle brake rigging 10 resulting in the longitudinal movement of the piston assembly 80 and the piston rod 90 in the first direction and in compression of the spring member 100. The fluid communication means or device 102 also is provided for evacuating the fluid pressure from the pressurized portion 75a of the housing 72 during brake release resulting in the longitudinal movement of the piston assembly 80 and the piston rod 90 in the second direction due to the force exerted by the released spring member 100.

The parking brake assembly 60 further includes a clamping means or device, generally designated as 110, which is provided for maintaining the extended position of the push rod 30 during reduction of the fluid pressure in the brake pipe 8 to a predetermined level and for releasing the push rod 30 to move in the second direction due to the increase of the fluid pressure in the brake pipe 8 above such predetermined level. In accordance with a presently preferred embodiment, such clamping device 110 includes a first elongated thread 112 formed on at least a portion of the exterior surface of the piston rod 90 movable through the non-pressurized portion 75b of the housing 72. A ratchet 114 is mounted within the non-pressurized portion 75b of the housing 72 for rotation about a longitudinal axis of the piston rod 90. A pair of optional bearings 115 may be provided for facilitating rotation of the ratchet 114. An aperture 116 is axially formed through the ratchet 114. A second thread 118 is formed on a surface of the axial aperture 116 for operable engagement with the first thread 112. There is a shaft 120 which is mounted for rotation in a spaced relationship with the ratchet 114. Rotational axis of the shaft 120 is substantially parallel to a rotational axis of the ratchet 114. The shaft 120 has a first end 122 thereof disposed within the non-pressurized portion 75b of the housing 72 and has a second end 124 thereof extending through an aperture 126 formed through the second end 74 of the housing 72 past an outer surface thereof. Finally, a holding pawl 128 is disposed within the non-pressurized portion 75b of the housing 72 and is secured to the shaft 120 for rotation therewith. The holding pawl 128 is rotatable in a first rotational direction for engagement with the ratchet teeth when a first rotational force is applied to the second end 124 of the shaft 120 due to the fluid pressure in the brake pipe 8 being reduced to a predetermined level. This engagement prevents movement of the push rod 30 in the second direction. The holding pawl 128 is rotatable in a second rotational direction for disengaging the ratchet teeth and permitting the push rod 30 to move in the second direction when a second rotational force is applied to at least one of the shaft 120 and the holding pawl 128 due to the increase of the fluid pressure in the brake pipe 8.

To mount the clamping device 110, the second end 74 of the housing 72 is formed by the first member 74a carrying the outer surface thereon and a second member 74b secured in spaced relationship with the first member 74a and wherein the ratchet 114 and the holding pawl 128 are mounted intermediate the first and the second members 74a and 74b. The first and the second members 74a and 74b are bolted to a flange 72a of the housing 72 in a conventional manner.

Figure 6:
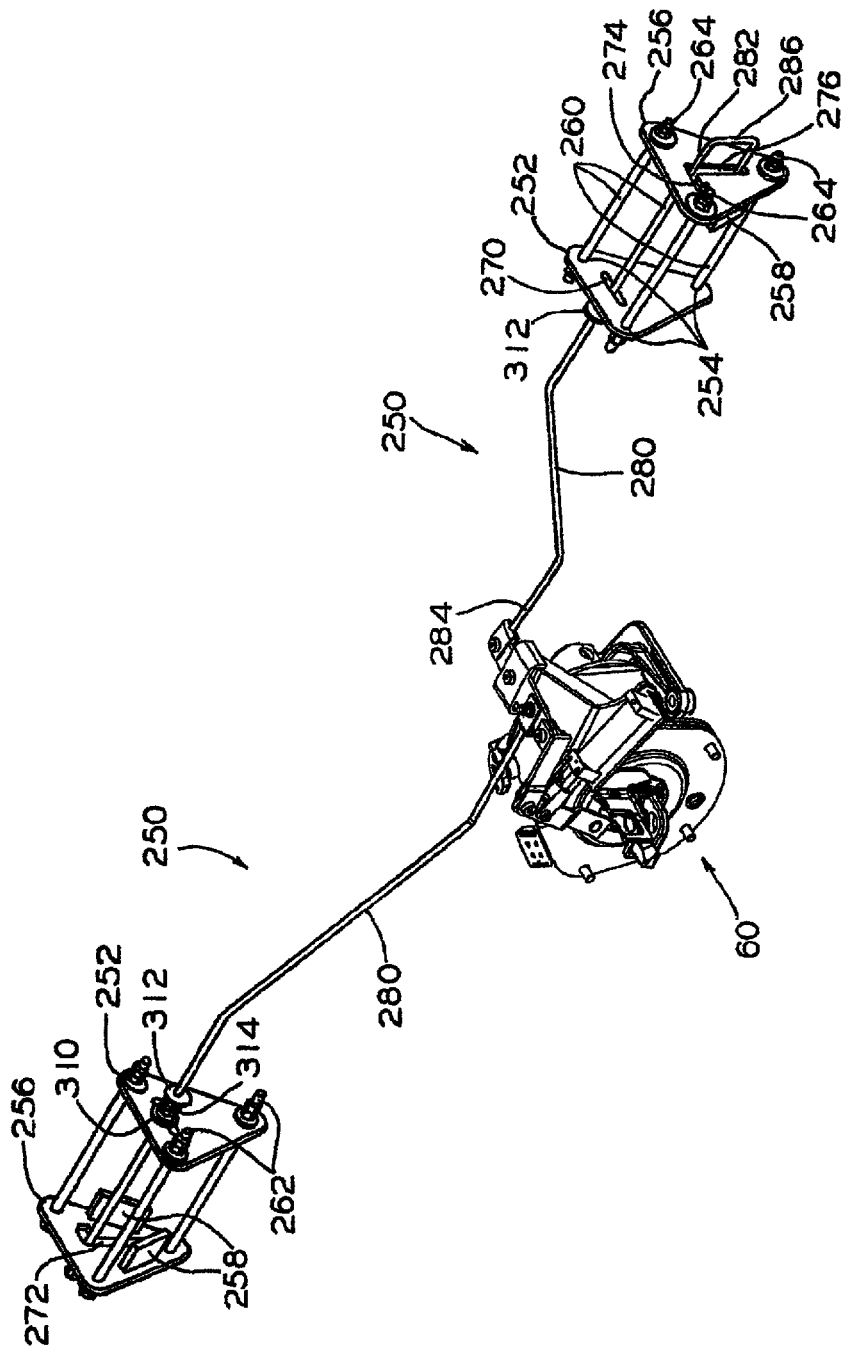
FIG. 6 is an isolation perspective view of the parking brake assembly shown in FIG. 1.
Figure 7:
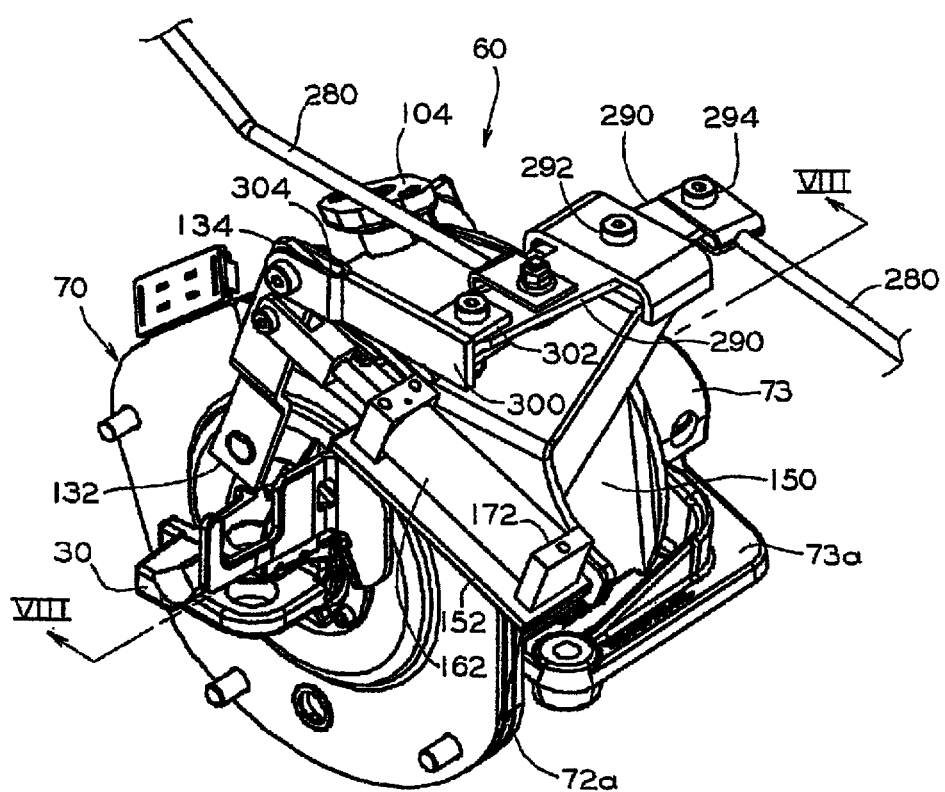
FIG. 7 is an enlarged perspective view of a brake actuator employed within the parking brake assembly.
Figure 8:
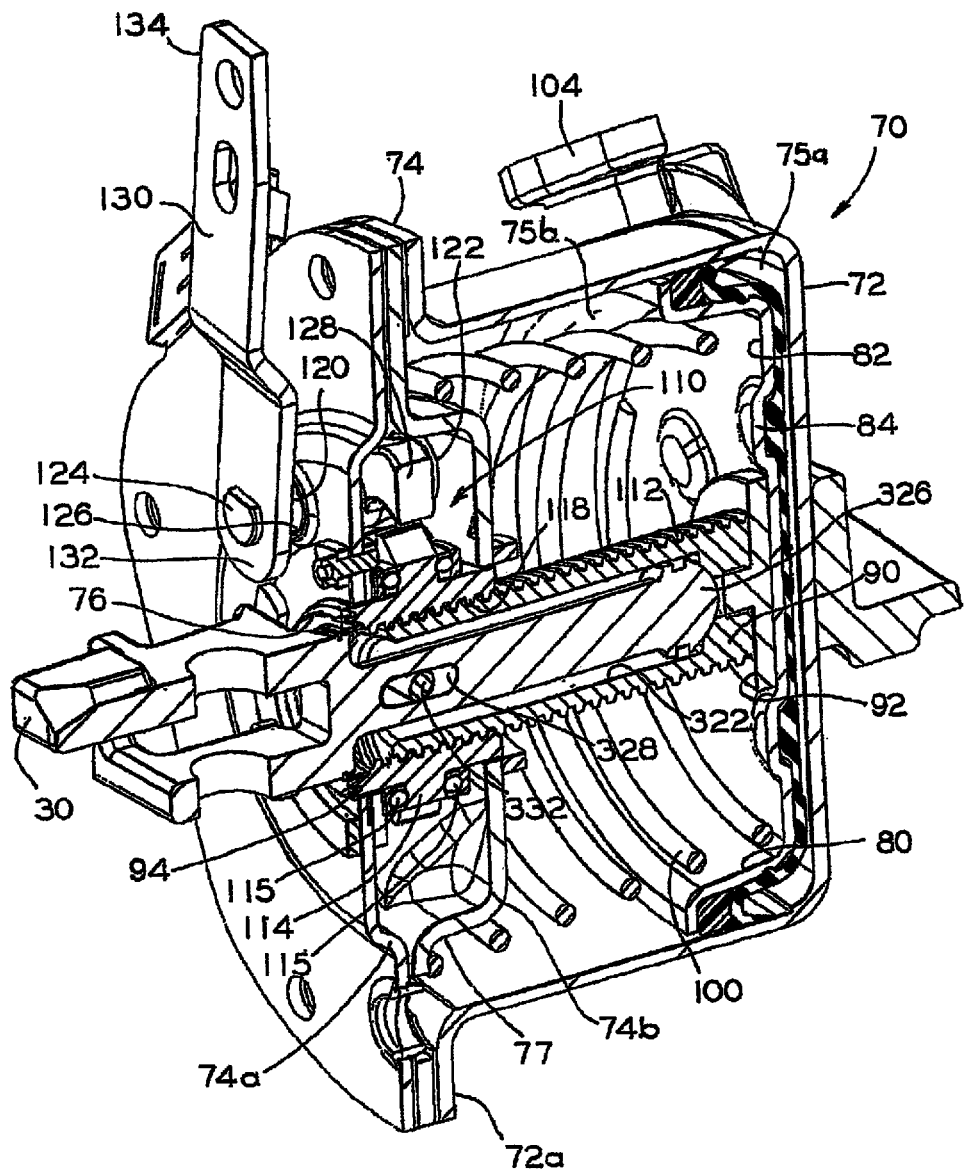
FIG. 8 is a cross-sectional view of the brake actuator taken along lines VIII-VIII in FIG. 7.
Figure 9:
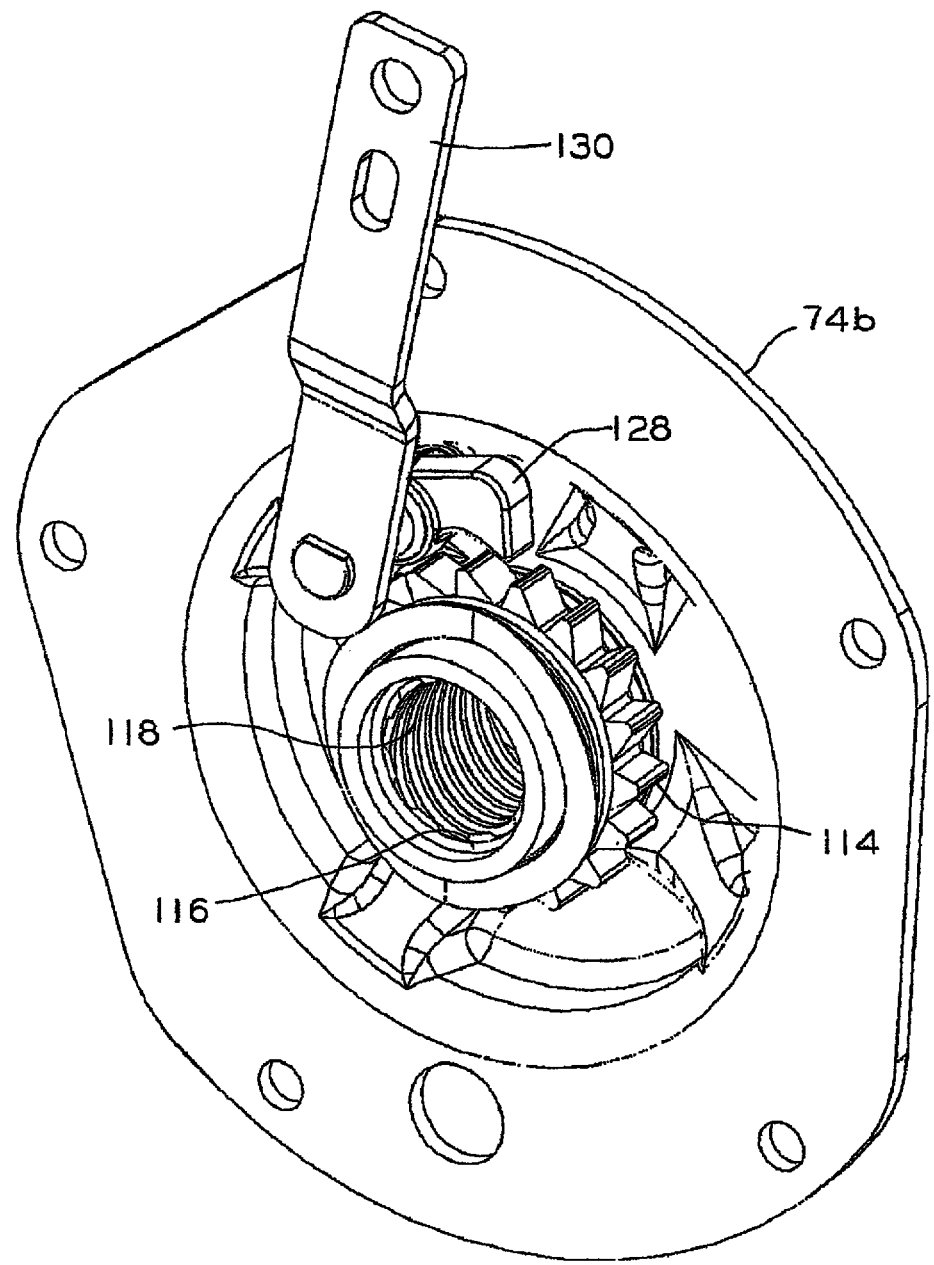
FIG. 9 is a partial perspective view of the brake actuator of FIG. 7.

Although the parking brake assembly of FIGS. 6-8 has been illustrated by employing a brake actuator 70 having a housing 72 and a piston 80, it is also within the scope of the present disclosure to employ a brake actuator using an air spring. Such brake actuator is disclosed in a utility patent application Ser. No. 10/645,035 filed on Aug. 21, 2003 and entitled "Universal Brake Assembly", now U.S. Pat. No. 8,033,533 to Ring et al., the disclosure of which is incorporated by reference herein.

The rotational force may be applied to the second end 124 of the shaft 120 manually, for example with a gripping type tool or a wrench (not shown), and preferably, an operating lever 130 is provided and has a first end 132 thereof disposed on and secured to the second end 124 of the shaft 120 for rotation therewith. Thus, the operating lever 130 is rotatable in the first rotational direction when the first rotational force is applied to a second end 134 thereof and is rotatable in the second rotational direction when the second rotational force is applied to the second end 134 thereof.

It is further contemplated to provide an operating means or device, generally designated as 140, which is responsive to a fluid pressure condition within the brake pipe 8 for selectively and automatically operating the clamping device 110 to maintain the push rod 30, after its movement in the first direction, in the position for applying brakes and to release the push rod 30 for movement in the second direction. Now with specific reference to FIGS. 7 and 10, such operating device 140 includes a mounting bracket 150 which is affixed to the outer surface of the second end 74 of the housing 72, preferably using the fasteners that attach the first and second members, 74a and 74b respectively, to the flange 72a. Thus, when installed, the mounting bracket 150 is disposed in a generally vertical plane. The mounting bracket 150 may be provided with a ledge portion 152, which is disposed generally horizontally. A pneumatically operated cylinder, generally designated as 160, is provided and is mounted on the ledge portion 152 of the mounting bracket 150. The pneumatically operated cylinder 160 has a casing 162, a piston assembly 164 mounted for a longitudinal movement within the casing, a piston rod 166 connected at a first end thereof to a first end of the piston assembly 164 and pivotally connected at a second end thereof to the second end 134 of the operating lever 130, and a spring 168 which is caged within the casing 162 between an end thereof and the second end of the piston assembly 164. When installed within the railway car 2, the piston assembly 164 and piston rod 166 move in a direction which is generally perpendicular to the movement direction of the piston assembly 80, piston rod 90 and push rod 30 as well as to the rotational axis of the ratchet 114 and the holding pawl 128.

A fluid communication means or device 170, including a conventional fluid port 172, is provided in fluid communication with a second end of the piston assembly 164 and with the brake pipe 8 for supplying the fluid pressure to a second end of the piston assembly 164 causing the piston rod 166 to move outwardly and apply the second rotational force. Furthermore, the second fluid communication device is provided for evacuating the fluid pressure from the second end of the piston assembly 164 when the fluid pressure in the brake pipe 8 is reduced below the predetermined level causing the spring 168 to extend and retract the piston rod 166 into the casing 162, thus applying the first rotational force to the second end 134 of the lever 130.

In normal operation, when the railway car 2 is in motion and/or when the fluid pressure in the brake pipe 8 is at its maximum, generally about ninety (90) pounds per square inch (PSI), the spring member 100 of the parking brake actuator 70 is extended and brakes are released. Consequently, the fluid pressure from the brake pipe 8 is supplied to the pneumatically operated cylinder 160, causing the piston rod 166 to apply a second rotational force to the operating lever 130 thus preventing the holding pawl 128 from engaging the ratchet 114.

When a partial brake application (10 PSI reduction from maximum in the brake pipe fluid pressure) or a full service brake application (25 PSI reduction in the brake pipe fluid pressure from maximum) is commanded from the locomotive (not shown), the fluid pressure is supplied to the pressurized portion 75a of the housing 72 causing the piston assembly 80 to move in the first direction toward the second end 74 of the housing 72 and against the resistance of the spring member 100 and, more particularly, causing the piston rod 90 and the push rod 30 to move in such first direction and apply brakes. When a brake release is commanded and the fluid pressure in the brake pipe 8 begins to rise, the fluid pressure is evacuated from the pressurized portion 75a of the housing 72 though the directional or transfer valve 9 causing the spring member 100 to extend moving the push rod 30 in the second direction and releasing the brake force. As long as the fluid pressure in the brake pipe 8 is above the predetermined level, the piston rod 166 continues to apply the second rotational force to the operating lever 130 thus preventing the holding pawl 128 from engaging ratchet teeth.

When the fluid pressure in the brake pipe 8 reduces below the predetermined level, which is generally set below the level present in full service brake application, the fluid pressure is evacuated from the pneumatically operated cylinder 160, causing the spring 168 to extend and retract the piston rod 166 into the casing 162, thus applying the first rotational force to the second end 134 of the lever 130 and engaging the holding pawl 128 with the ratchet 114. Since the brake actuator 70 will operate as described above to move the push rod 30 in the first direction apply braking force, the engagement of the holding pawl 128 with the ratchet 114 will maintain the push rod 30 in such brake applied condition. Advantageously, the ratchet teeth are formed so that the ratchet 114 rotates to allow movement of the push rod 30 in the first direction even when the holding pawl 128 engages the ratchet 114 prior to the push rod 30 completing its movement to apply brakes.

When the supply of the fluid pressure to the cylinder 160 is restored, the piston rod 166 will move outwardly from the housing 162 and apply a second rotational force to the operating lever 130 thus disengaging the holding pawl 128 from engagement with ratchet 114. The predetermined fluid pressure level in the brake pipe 8 at which the holding pawl 128 engages the ratchet 114 is also dependent on the rate of the spring 168 as well as on specific application requirements. For example, it may be desirable for the holding pawl 128 to engage the ratchet 114 only during a rapid fluid pressure decrease that is commonly known as an emergency brake application when the fluid pressure in the brake pipe reduces to about 10 PSI and then further to 0 PSI.

It is also within the scope of the present disclosure to evacuate fluid pressure from and re-supply it to the pneumatically operated cylinder 160 at different pressure levels within the brake pipe 8. By way of an example only, it may be advantageous to begin disengaging the holding pawl 128 from engagement with the ratchet 114 when the fluid pressure in the brake pipe is increased to about 25 PSI.

While the above described operation provides for automatic application and release of the brakes, it is also possible to provide a manually operable release means or device, generally designated as 200, which is coupled to the pneumatically operated cylinder 160 for manually releasing the push rod 30 to move in the second direction. According to one embodiment, such manually operable release device 200 includes a release shaft 202 in secured threaded engagement to the casing 162 of the pneumatically operated cylinder 160. The release shaft 202 has a first end thereof coaxially secured to the second end of the piston 164 and having a second end thereof extending outwardly from the casing 162, whereby selective manual rotation of the second end of the release shaft 202 causes extension or retraction of the piston rod 166 rotating the operating lever 130 in the first or second rotational directions.

According to another embodiment, the manually operable release device 200 includes a valve 210, best illustrated in FIG. 11, which is disposed within the fluid communication means or device 170 intermediate the brake pipe 8 and the pneumatically operated cylinder 160. The valve 210 is operable in a first position for supplying the fluid pressure to the pneumatically operated cylinder 160 when the fluid pressure in the brake pipe 8 is maintained above the predetermined level. In this position, the fluid pressure compresses an extension spring 212 mounted within the valve 210 allowing the fluid pressure to flow through to the pneumatically operated cylinder 160. The valve 210 is also operable in a second position to discontinue, due to release of the compressed spring 212, supply of the fluid pressure to the pneumatically operated cylinder 160 and exhaust the fluid pressure from the pneumatically operated cylinder 160 to atmosphere. When the fluid pressure decreases below the predetermined set level, the spring 212 extends and blocks the flow of the fluid pressure through the valve 210 and opens passage to its exhaust port. The valve 210 also includes a manually operable means or device, such as a pushbutton 214 disposed therein, for manually restoring the supply of the fluid pressure to the pneumatically operated cylinder 160. Manual actuation of the pushbutton 214 briefly compresses the spring 212 to allow the flow of the fluid pressure through the valve 210 which will keep the spring 212 in a compressed condition when the pushbutton 214 is released. A pair of valves 210 may be provided, each installed adjacent a respective end of the railway car 2 to reduce the labor of releasing applied parking brake assembly 60 by eliminating the operator of the railway car 2 to walk to the end having the parking brake assembly 60 installed on.

According to yet another embodiment, the manually operable release means or device 200 may include a two-position, three-port valve 220, best shown in FIG. 10. An auxiliary reservoir 222 of the fluid pressure may be connected at one port thereof to the brake pipe 8 through a check valve 224 and a restricting choke 226 mounted in series with the check valve 224 and connected at another port thereof to the valve 220.

It is also within the scope of the present disclosure to provide other means or devices for operating the valve 210 or 220 to restore of the fluid pressure to the pneumatically operated cylinder 160. By way of an example shown in FIG. 11, a three-way valve 230 may be provided, wherein the pushbutton 214 has been replaced with a solenoid 232 so that the valve 210 can be operable in the second position for allowing flow of the fluid pressure therethrough by an electrical signal which can be remotely transmitted, for example from the locomotive (not shown) by any well known methods including wires, radio frequency, satellite communicating and the like methods. This embodiment allows remote release of the applied parking brake assembly 60. Advantageously, the valve 230 may be adapted with a second solenoid 234 to remotely operate such valve 230 into the position for enabling flow of the fluid pressure to the cylinder 160 and, more particularly, allowing remote application of the parking brake assembly 60.

The present disclosure also contemplates to provide either valve 210, 220, or 230 in combination with the release shaft 202 of FIG. 10. For example, a manually operable valve 210 or 220 is mounted in close proximity to the end or the side of the railway car 2 enabling the operator of the railway car 2 to safely and conveniently operate the parking brake assembly 60 from one side of the railway car 2 without the need to reach underneath thereof and into the confines of the truck apparatus 3. It will be appreciated that the above described manual release means or devices 200 are of a pneumatic type. It is also possible to provide the manual release devices as a mechanical type device which does not depend on presence or absence of the fluid pressure in the brake pipe 8 to release applied brakes. Such a mechanical manual release device, generally designated as 250, is described herein in combination with the brake rigging 10 installed within the truck apparatus 3 carrying one end of the railway vehicle body. As was described above, such truck apparatus 3 includes the frame 5 having the pair of side members 6a and 6b joined by the bolster 7.

Now with specific reference to FIGS. 2-7, the manual release means or mechanism 250 includes a first plate-like member 252 in abutted engagement to an inner vertical surface portion of one side member, shown as 6a, of the truck apparatus 3. A first plurality of apertures 254 are formed through the first plate-like member 252 and are disposed in a predetermined pattern. A second plate-like member 256 in abutted engagement to an outer vertical surface portion of the side member 6a. A second plurality of apertures 254 are formed through the second plate-like member 256 and are disposed in the same predetermined pattern as the apertures 254 formed through the first plate-like member 252. Each of the second plurality of apertures 254 is aligned with a respective one of the first plurality of apertures 254. There is a plurality of rods 260 provided with each passed through aligned apertures 254 in the first and second plate-like members, 252 and 256 respectively. A male thread 262 is formed on each end of each rod 260. A plurality of threaded fasteners 264 is used, with each fastener 264 operably engaging a respective rod end for affixing the first and second plate-like members, 252 and 256 respectively, about the side member 6a by caging a portion thereof between these plate-like members.

Further, an elongated slot 270 is formed though a first plate-like member 252 and extends in a generally horizontal direction. An L-shaped slot 272 is formed in the second plate-like member 256 and has a horizontal leg 274 thereof aligned with the elongated slot 270 formed through the first plate-like member 252. The L-shaped slot 272 also has a vertical leg 276. An elongated link member 280 is provided and has a predetermined shape for routing through the truck apparatus 3. The first end 282 of the link member 280 passes through the elongated slot 270 and through the L-shaped slot 272 and extends outwardly from the second plate-like member 254. There is also a mechanical arrangement for connecting a second end 284 of the link member 280 to the parking brake assembly 60. A grip member 286 is disposed on and secured to the first end 282 of the elongated link member 280. This grip member 286 is manually operable to move the link member 280 from a first position enabling application of the parking brake assembly 60 into a second position enabling release of an applied parking brake assembly 60. The grip member 286 may be shaped as a conventional handle and may be further provided integral with the link member 280 by bending the second end 284 thereof. A biasing means or element is provided and is engaged with the elongated link member 280 for returning the link member 280 into the first position upon release of the grip member 286.

The mechanical arrangement for connecting the second end 284 of the elongated link member 280 to the parking brake assembly 60 includes first release lever 290 which is pivotally connected to the mounting bracket 150. By way of an example shown in FIGS. 6-7, such pivotal connection may be achieved with a pin or fastener 292 passed through aligned apertures (not shown) in the first release lever 290 and the mounting bracket 150. There is also pivotal connection pivotally connecting the second end 284 of the elongated link 280 to one end of the first release lever 290. By way of an example shown in FIGS. 6-7, such second end 284 may be formed as a bifurcated portion with an aperture (not shown) formed therethrough and aligned with another aperture (not shown) formed through the first release lever 290, and wherein a pin or fastener 294 passes through these aligned apertures (not shown). There is also a second release lever 300 having a first end 302 thereof pivotally connected to a second end of the first release lever 290 and having a second end 304 thereof pivotally connected to the second end 134 of the operating lever 130.

In operation, manually initiated movement of the elongated link 280 from the first position toward the second position causes rotational movement of the operating lever 130 in the second rotational direction due to rotation of each of the first and second release levers, 290 and 300 respectively, thus enabling the holding pawl 284 to disengage the ratchet teeth and enable the push rod 30 to move in the second direction due to extension of the spring 100 thus releasing the applied braking force. During manual release of the brakes, the grip member 286 is movable through a vertical leg 276 of the L-shaped slot 272 and, accordingly, the manual release mechanism 250 includes a pair of spacers 258 rigidly secured to an inner surface of the second plate-like member 256 for positioning it in a spaced relationship with the outer surface of the side member 6a and for enabling movement of the grip member 286 through the vertical leg 276 of the L-shaped slot 272. The employment of the horizontally disposed leg 274 enables the operator of the railway car 2 to move the grip member 286 through the vertical leg 276 sufficiently to clear the outer surface of the second plate-like member 256 and then move the grip member 286 laterally along the first leg 274 to latch such grip member 286 against the outer surface of the second plate-like member 256 to prevent the elongated link 280 from returning into the first position and, more particularly, prevent the holding pawl 128 from reengaging the ratchet 114. Thus, the railway car 2 can be freely moved. When required, the user laterally moves the grip member 286 in the opposite direction so it can move through the vertical leg 276 thus allowing the link member 280 to return into the first position due to the action of the biasing means. It is also possible to angle the leg 274 downwardly in order to facilitate retention of the grip member 286.

With particular reference to FIG. 7, the biasing means or device may be formed by a first washer 310 movably secured to the elongated link member 280, a second washer 312 rigidly secured to the elongated link member 280 in spaced relationship with the first washer 310, and a spring 314 caged between the first washer 310 and the second washer 312. It will be appreciated that the spring 314 will be compressed during movement of the elongated link member 280 into the second position and extend when the manual movement is discontinued and when the link member 280 is unlatched, thus returning it into the first position. The manual release mechanism 250 enables the operator of the railway car 2 to safely and conveniently release the applied parking brake assembly 60 from one side of the railway car 2 without the need to reach underneath thereof and into the confines of the truck apparatus 3. It is further possible to provide a second manual release mechanism 250 operable from the other side of the railway car 2 as best shown in FIGS. 2-4 and 7.

Figure 12:
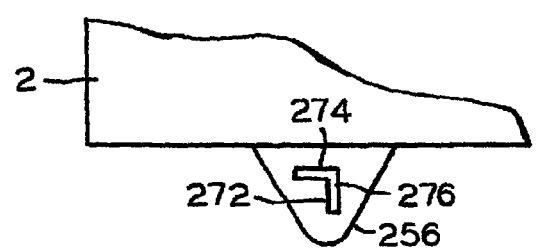
FIG. 12 is an elevation view of a mechanically operated manual release assembly, illustrated in FIG. 6, and connected to the side of the railway car body shown in FIG. 3.

Although the manual release mechanism 250 has been shown and described in terms of the parking brake assembly 60 being used with a truck mounted brake system, it will be apparent to those skilled in the art that the manual release mechanism 250 may be applied with the parking brake assembly being used with a car body mounted brake system by simply securing the second plate-like member 256 to the side of the railway car body and simply connecting the first end 282 of the elongated member 280 to the second plate-like member 256, as depicted in FIG. 12.

Although the present disclosure has been shown in terms of the parking brake assembly 60 being used with a truck mounted brake rigging 10, it will be apparent to those skilled in the art, that the concepts described herein may be applied to a car mounted brake system. Such car mounted brake system may be of a type as disclosed for example in FIG. 1 of U.S. Pat. No. 6,854,570 issued to Connell and whose teachings are incorporated into this document by reference thereto. Accordingly, the brake actuator 12 of FIG. 1 of U.S. Pat. No. 6,854,570 may be replaced with a brake actuator constructed according to the construction of the brake actuator 70 with further accommodations for operating a pair of truck mounted brake riggings from a single brake actuator. It will be further apparent to those skilled in the art, that at least the cylinder 160 may be replaced with a linear electrical drive, such as a linear motor, solenoid or a screw drive, which can be locally or remotely operated to at least release the applied parking brake assembly which can be also of an electrically actuated type.

The present disclosure also contemplates to provide means for compensating for bail of the push rod 30 moving laterally during the rotation of the force-transfer lever 24 and, at the same time, prevent rotation of the piston rod 90 during longitudinal movement. Now in reference to FIG. 8, such means includes an axial cavity 322 formed within the piston rod 90 and defining a peripheral wall of the piston rod 90. An aperture is formed through the peripheral wall. An elongated abutment 326 is disposed on and secured to the push rod 30 and is positioned within the axial cavity 322. A slot 328 is formed through the abutment 326 in alignment with the aperture 330 formed through the peripheral wall of the piston rod 90. An elongated pin 332 is frictionally passed through a combination of the slot 328 and the aperture 330 formed through the peripheral wall of the piston rod 90 allowing for axial movement of the push rod 30 while preventing rotational movement of the piston rod 90.

Figure 13:
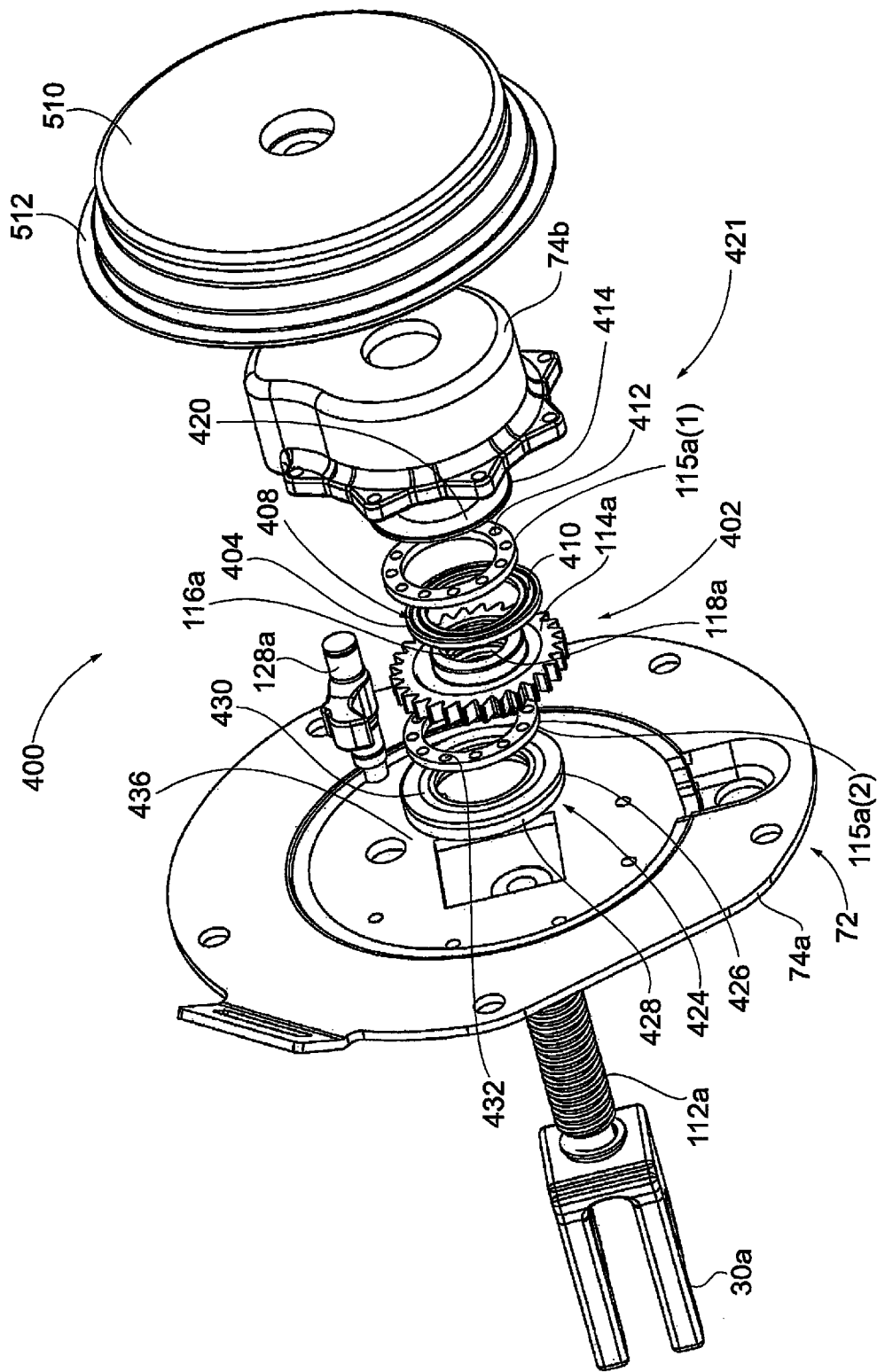
FIG. 13 is an exploded perspective view of a bail compensation joint for another embodiment of a brake actuator that is part of a parking brake assembly.
Figure 14:
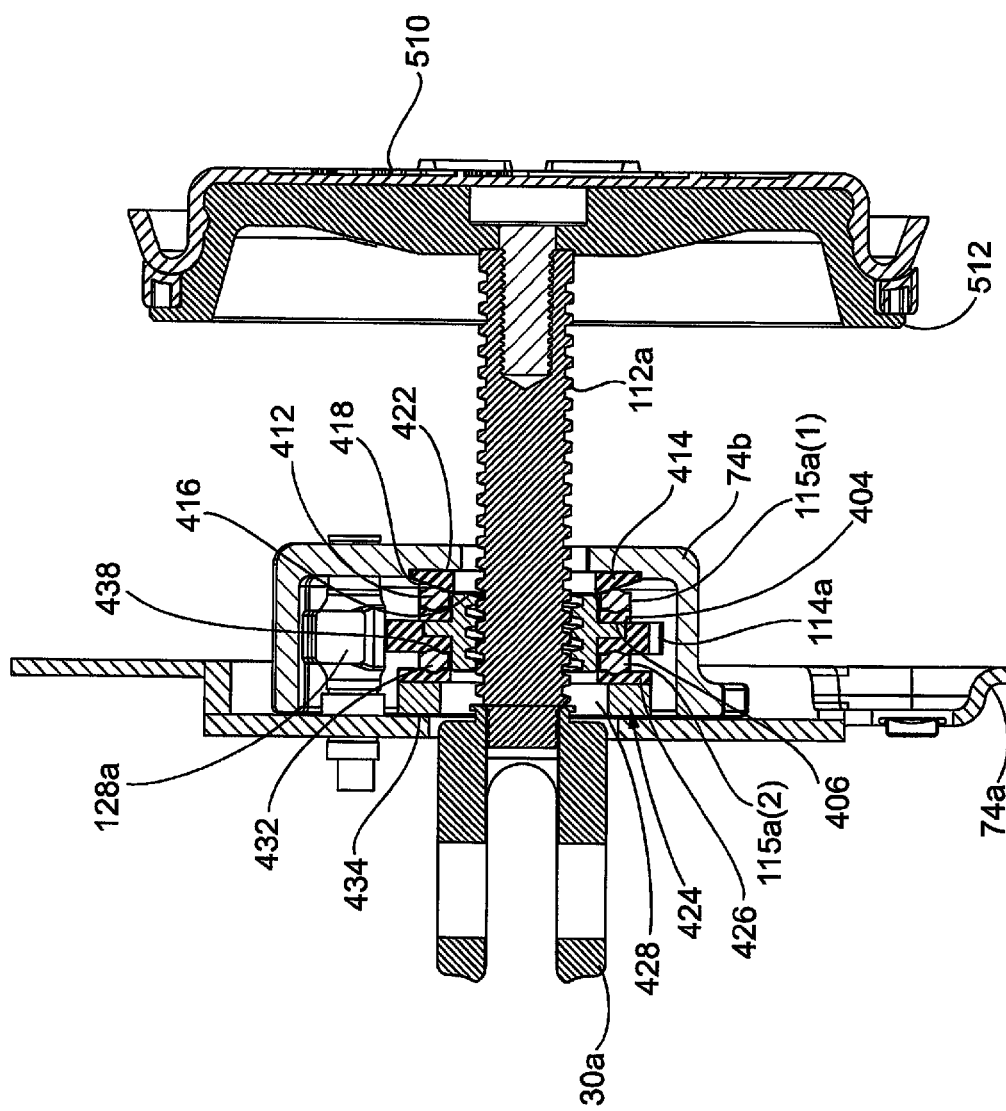
FIG. 14 is a longitudinal cross-sectional view of the bail compensation joint of FIG. 13.

With the foregoing discussion of various known embodiments, this disclosure provides a description of several embodiments of a bail compensating joint 400 for bail movement of a push rod 30a, to be described in detail herein, and a manual brake release mechanism 600, the details of which are also set forth herein. Referring to FIGS. 13-14, an embodiment of a bail compensating joint or arrangement 400 for compensating for bail or angular movement of a push rod 30a is illustrated. In the depicted embodiment, the push rod 30a is a one-piece solid rod with external or first threads 112a for providing a threaded engagement with internal or second threads 118a in the axial aperture 116a of a ratchet 114a. Thus, the solid threaded push rod 30a takes the place of the two-piece push rod 30 comprising the piston rod 90 and elongated abutment 326 discussed previously in connection with FIG. 8. The ratchet 114a and holding pawl 128a are similar to the ratchet 114 and holding pawl 128 as shown and discussed in connection with FIG. 8.

Further, the bail compensating arrangement or joint 400 comprises a helical joint 402 to convert rotational movement into translational linear movement through varying degrees of angularity of the push rod 30a without causing binding of the threaded helical connection between the push rod 30a and the ratchet 114a. In the depicted embodiment, the helical joint 402 comprises a pair of bearings 115a for facilitating rotation of the ratchet 114a. The pair of bearings 115a comprises a first or inner bearing 115a(1) and a second or outer bearing 115a(2). The first or inner bearing 115a(1) is disposed on the ratchet 114a between the ratchet 114a and the second end 74 of the housing 72. As described previously in connection with FIG. 8, the second end 74 of the housing 72 is formed by a first member 74a and a second member 74b secured in spaced relationship with the first member 74a, and wherein the ratchet 114a and the holding pawl 128a are mounted intermediate the first and the second members 74a and 74b. The first and the second members 74a and 74b are bolted together, with the first member 74a adapted further to be bolted to a flange 72a of the housing 72, which is shown in FIG. 8. The first bearing 115a(1) is supported by a spherical joint 421 including an annular inner race member 404 or first annular inner race member 404, and an annular outer race member 414 or first annular inner race member 404. The annular inner race member 404 has a first side 406 seated against the ratchet 114a and an opposing second side 408 defining a race track or groove 410 for ball bearings 412 of the first bearing 115a(1). The annular outer race member 414 has a first side 416 defining a tapered annular surface 418 engaged with the ball bearings 412 of the first bearing 115a(1) to permit angular movement of the helical joint 402 relative to the second member 74b of the second end 74 of the housing 72. The opposing second side 420 of the annular outer race member 414 is generally planar and seated against an interior surface 422 of the second member 74b of the second end 74 of the housing 72.

The second or outer bearing 115a(2) is supported on an outer side by an annular composite race member 424 formed by an annular inner, typically metal, race member 426 joined, typically adhesively, with an annular outer, resiliently deformable or rubber, member 428. The annular inner race member 426 may be deemed a second annular inner race member 426 and the annular outer member may be deemed a second annular outer member or a second annular outer race member 428. The composite race member 424 supports the second bearing 115a(2) with the annular inner race member 424 engaging the second bearing 115a(2) and defining a race track or groove 430 for ball bearings 432 of the second bearing 115a(2), and the annular outer member 428 having a planar surface 434 seated against an interior surface or wall 436 of the first member 74a of the second end 74 of the housing 72. The resiliently deformable or rubber material of the annular outer member 428 permits angular movement of the helical joint 402 relative to the first member 74a of the second end 74 of the housing 72. With the helical joint 402 constructed as provided above, bail or angular motion of the solid push rod 30a is accommodated by the helical joint 402 on either side of the ratchet 114a, thereby limiting the potential for binding engagement between the exterior threads 112a on the push rod 30a and the interior threads 118a in the axial aperture 116a of the ratchet 114a. In summary, the helical joint 402 can rotate through varying degrees of angularity without causing binding of the threaded helical connection between the push rod 30a and the ratchet 114a. The annular outer member 428 of the outer composite race member 410 is typically bonded adhesively to a flat face of the inner race member 426 and is desirably a rubber pad that allows compression and, in turn, the rotation of the helical joint 402 through varying degrees of angularity. As shown in FIGS. 13 and 14, a race track or groove 438 for the ball bearings 432 of the second bearing 115a(2) is provided in an outward facing side of the ratchet 114a to support the second or outer bearing 115a(2) on the opposite side.

Figure 15:
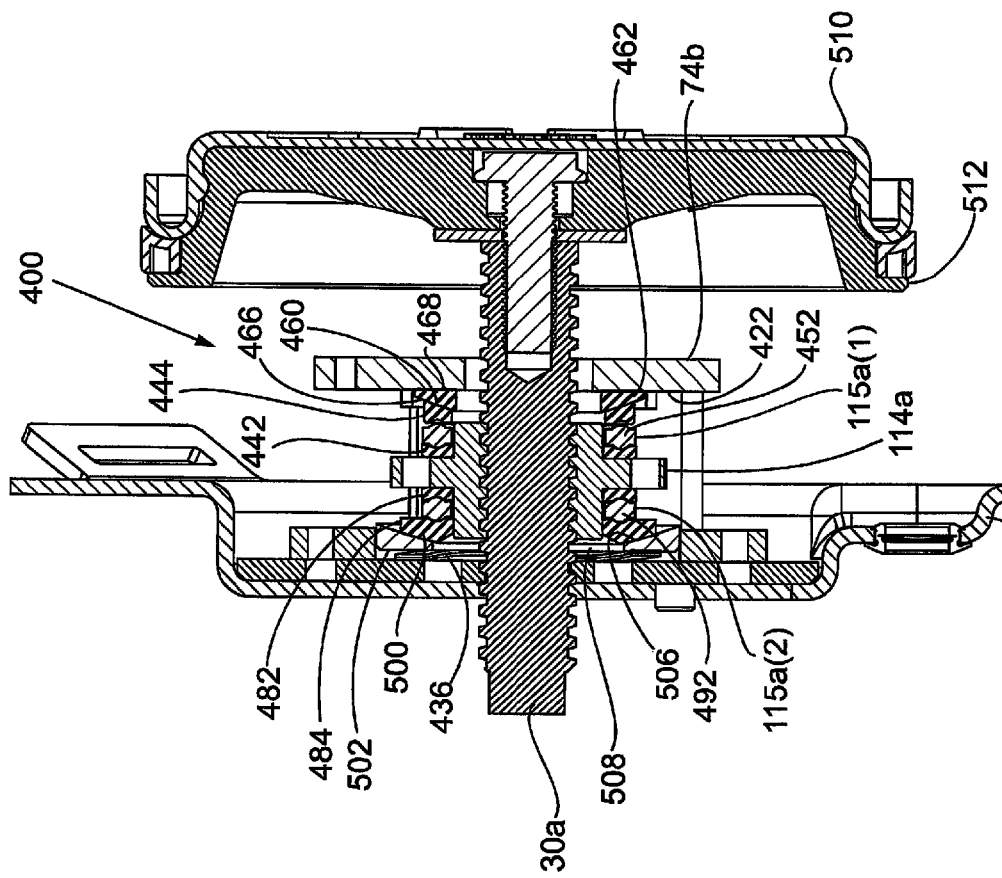
FIG. 15 is a longitudinal cross-sectional view of another embodiment of a bail compensation joint for another embodiment of a brake actuator that is part of a parking brake assembly.
Figure 16:
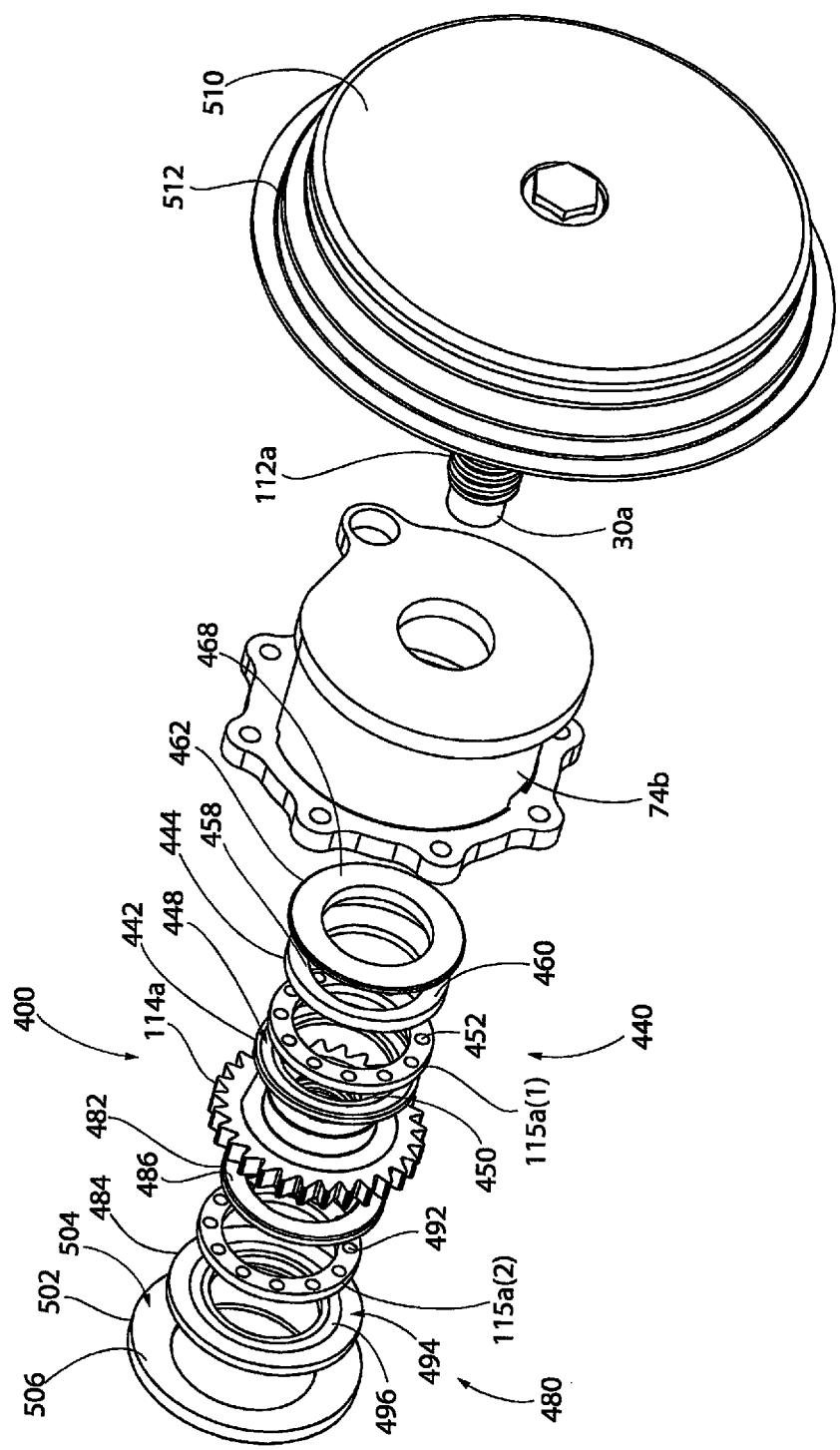
FIG. 16 is a first exploded perspective view of the bail compensation joint of FIG. 15.
Figure 17:
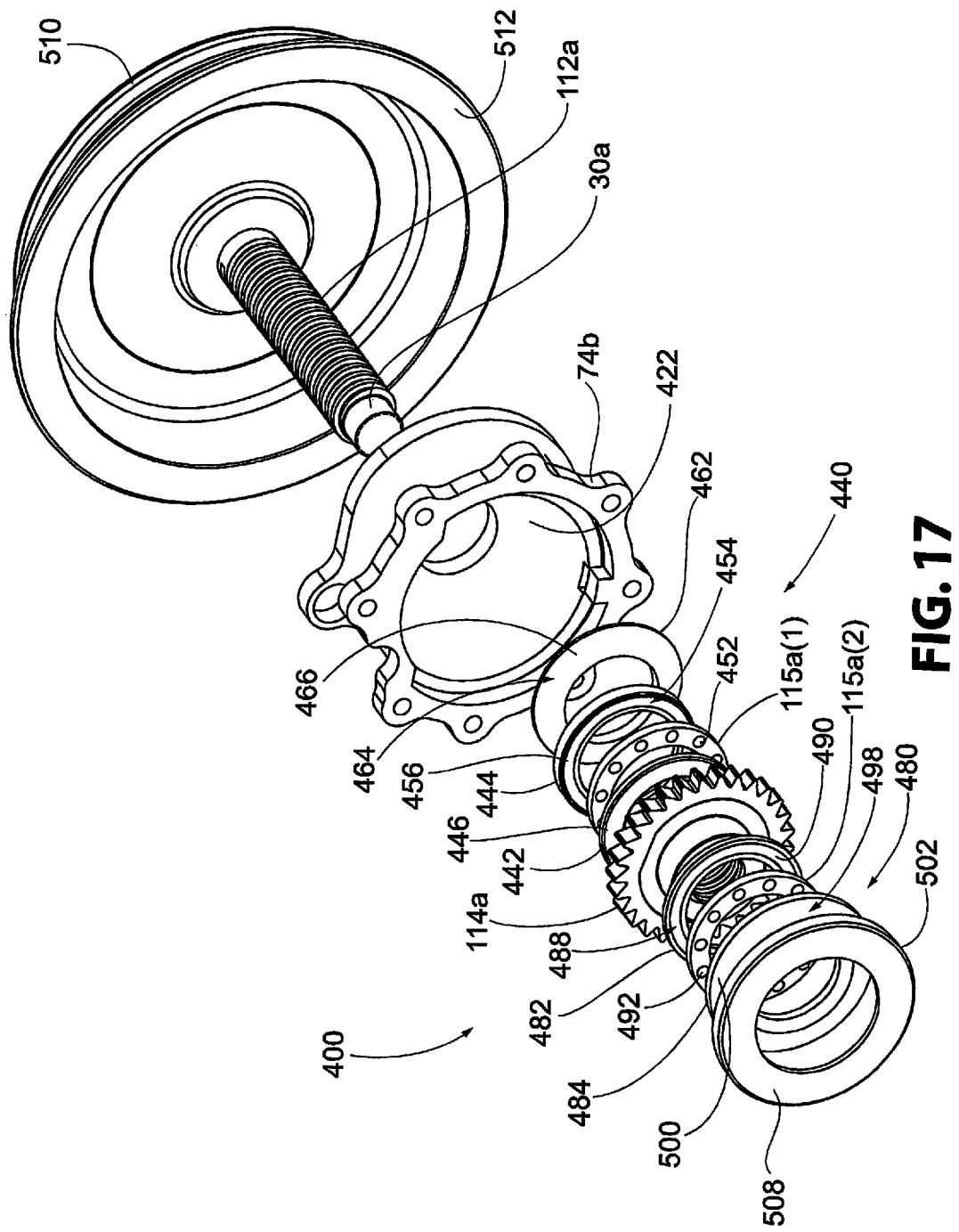
FIG. 17 is a second exploded perspective view of the bail compensation joint of FIG. 15, viewed from the opposite end from the view shown in FIG. 16.

Referring to FIGS. 15-17, another embodiment of a bail compensating arrangement or joint 400 is shown which provides two spherical joints 440, 480 to convert rotational movement into translational linear movement through varying degrees of angularity of the push rod 30a without causing binding of the threaded helical connection between the push rod 30a and the ratchet 114a. The spherical joints 440, 480 are disposed on opposite sides of the ratchet 114a, which is again in threaded engagement with the one-piece solid push rod 30a as in the embodiment described above in connection with FIGS. 12-13. The first or inner spherical joint 440 comprises a first or inner bearing 115a(1) supported on an inner side by an annular inner race member 442, or first annular inner race member 442, and on outer side by an annular outer race member 444, or first annular outer race member 444. The annular inner race member 442 has a first side 446 seated against the ratchet 114a and has a second side 448 that defines a race track or groove 450 for ball bearings 452 of the first or inner bearing 115a(1). The annular outer race member 444 has a first side 454 that defines a race track or groove 456 for the ball bearings 452 of the first or inner bearing 115a(1), and a second side 458 defining a first shaped or concave-shaped or dish-shaped annular surface 460. The concave-shaped surface 460 is engaged with an annular outer member 462, or first annular outer member 462. More particularly, the annular outer member 462 has a first side 464 defining a second shaped or convex-shaped surface 466 shaped to engage the concave-shaped surface 460 on the second side 458 of the annular outer race member 444 in a complementary manner. The annular outer member 462 further has a second, planar side 468 seated against the interior surface 422 of the second member 74b of the second end 74 of the housing 72. The concave-convex (e.g., female-male) engagement between the annular outer race member 444 and the annular outer member 462 enables the first or inner spherical joint 420 to convert rotational movement into translational linear movement through varying degrees of angularity without causing binding of the threaded helical connection between the push rod 30a and the ratchet 14a.

The second or outer spherical joint 480 is generally a mirror image of the first or inner spherical joint 440. The second or outer spherical joint 480 comprises a second or outer bearing 115a(2) supported on an inner side by an annular inner race member 482, or second annular inner race member 482, and on outer side an annular outer race member 484, or second annular outer race member 484. The annular inner race member 482 has a first side 486 seated against the ratchet 114a and has a second side 488 that defines a race track or groove 490 for the ball bearings 492 of the second or outer bearing 115a(2). The annular outer race member 484 has a first side 494 that defines a race track or groove 496 for the ball bearings 492 of the second or outer bearing 115a(2), and a second side 498 defining a convex-shaped surface 500. The convex-shaped surface 500 is engaged with an annular outer member 502, or second annular outer member 502. More particularly, the annular outer member 502 has a first side 504 defining a dish-shaped, concave-shaped or third shaped surface 506 shaped to engage the opposing convex-shaped or fourth shaped surface 500 on the second side 498 of the annular outer race member 484 in a complementary manner. The annular outer member 502 further has a second, planar side 508 seated against the interior surface or wall 436 (see FIGS. 13-14) of the first member 74a of the second end 74 of the housing 72. The convex-concave (e.g., male-female) engagement between the annular outer race member 484 and the annular outer member 502 enables the second or outer spherical joint 440 to convert rotational movement into translational linear movement through varying degrees of angularity without causing binding of the threaded helical connection between the push rod 30a and the ratchet 14a. In the foregoing embodiments shown in FIGS. 13-17, the second member 74b of the second end 74 of the housing 72 may be enclosed by a housing enclosure 510 having a rim or flange 512 seated against and secured to first member 74a of the housing 72.

Figure 2:
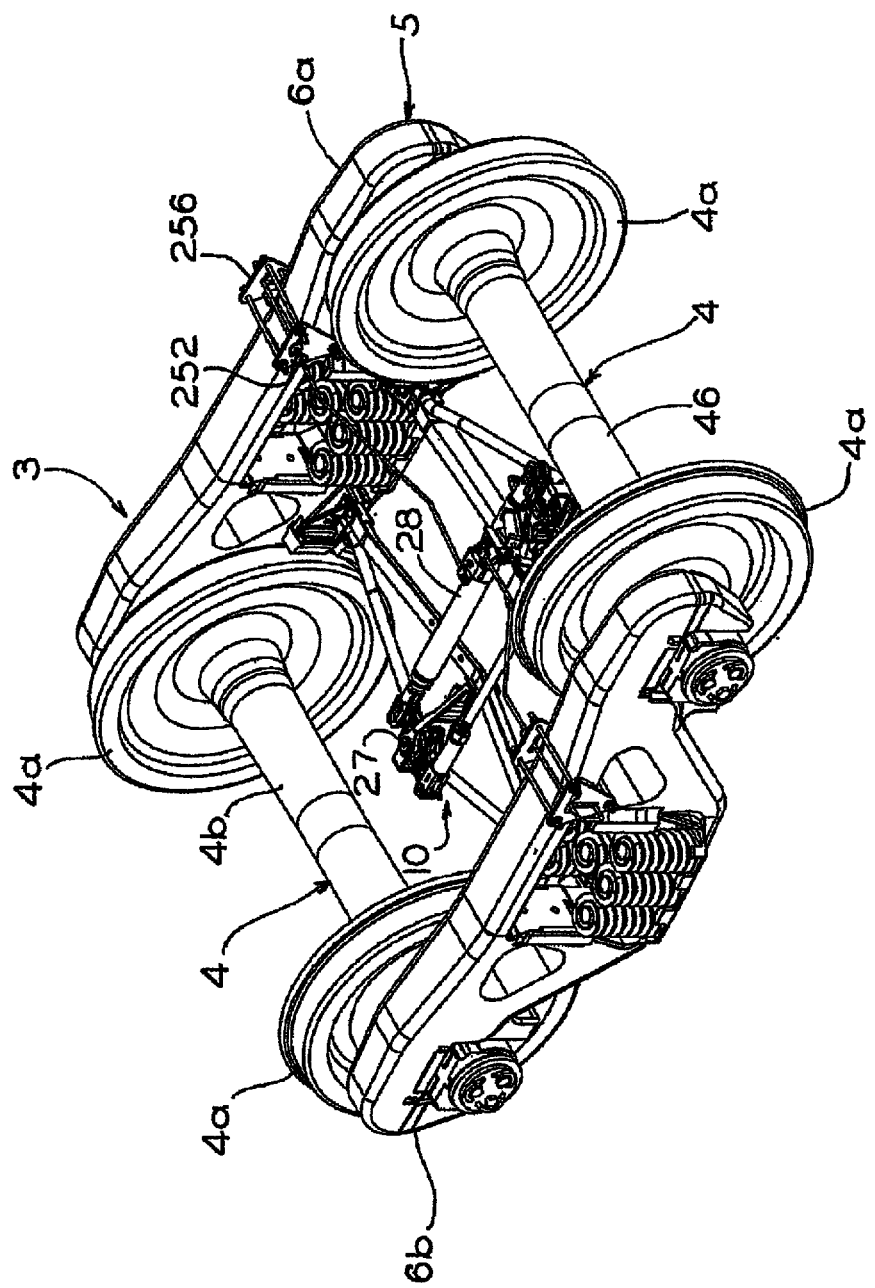
FIG. 2 is perspective view of a parking brake assembly installed within the truck apparatus of the railway car shown in FIG. 1.
Figure 3:
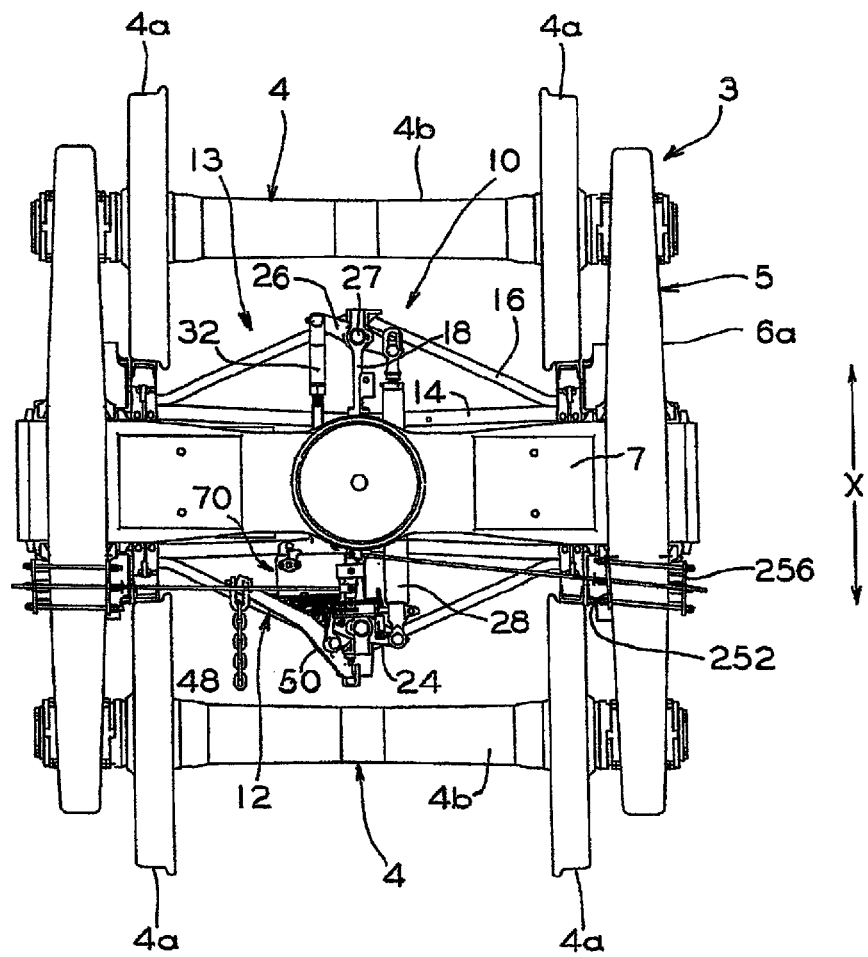
FIG. 3 is a plan view of the parking brake assembly of FIG. 2.
Figure 4:
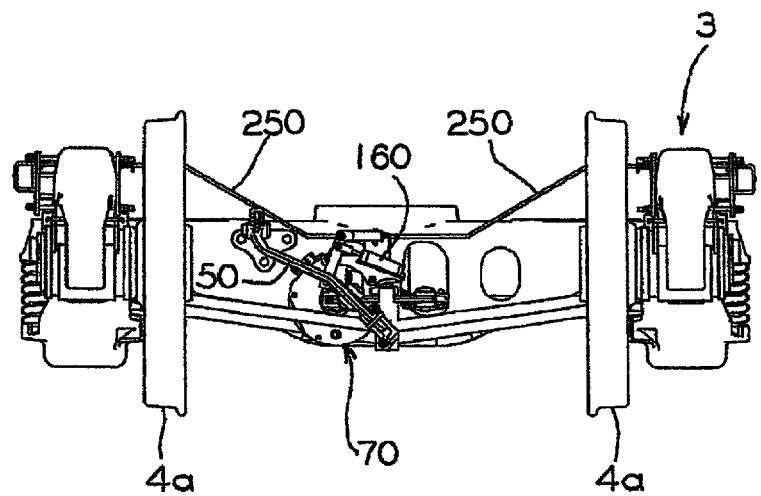
FIG. 4 is a front elevation view of the parking brake assembly of FIG. 2.
Figure 5:
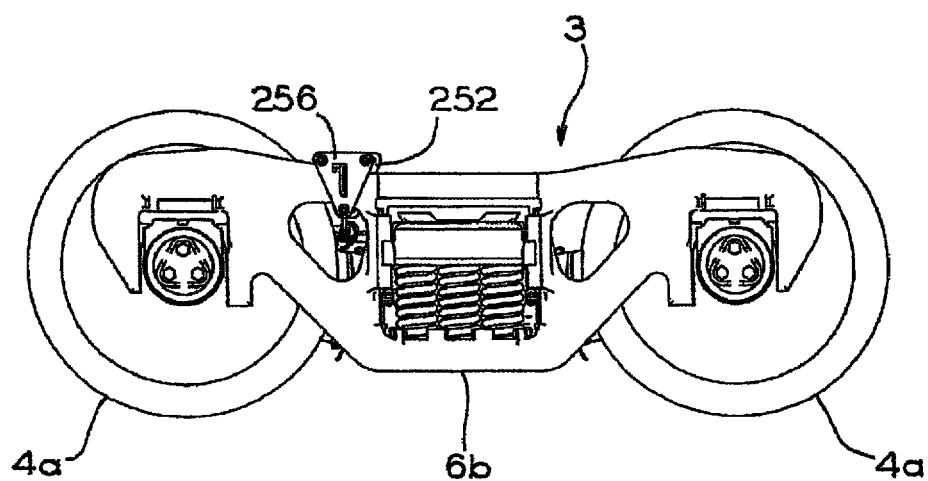
FIG. 5 is a side elevation view of the parking brake assembly of FIG. 2.
Figure 18:
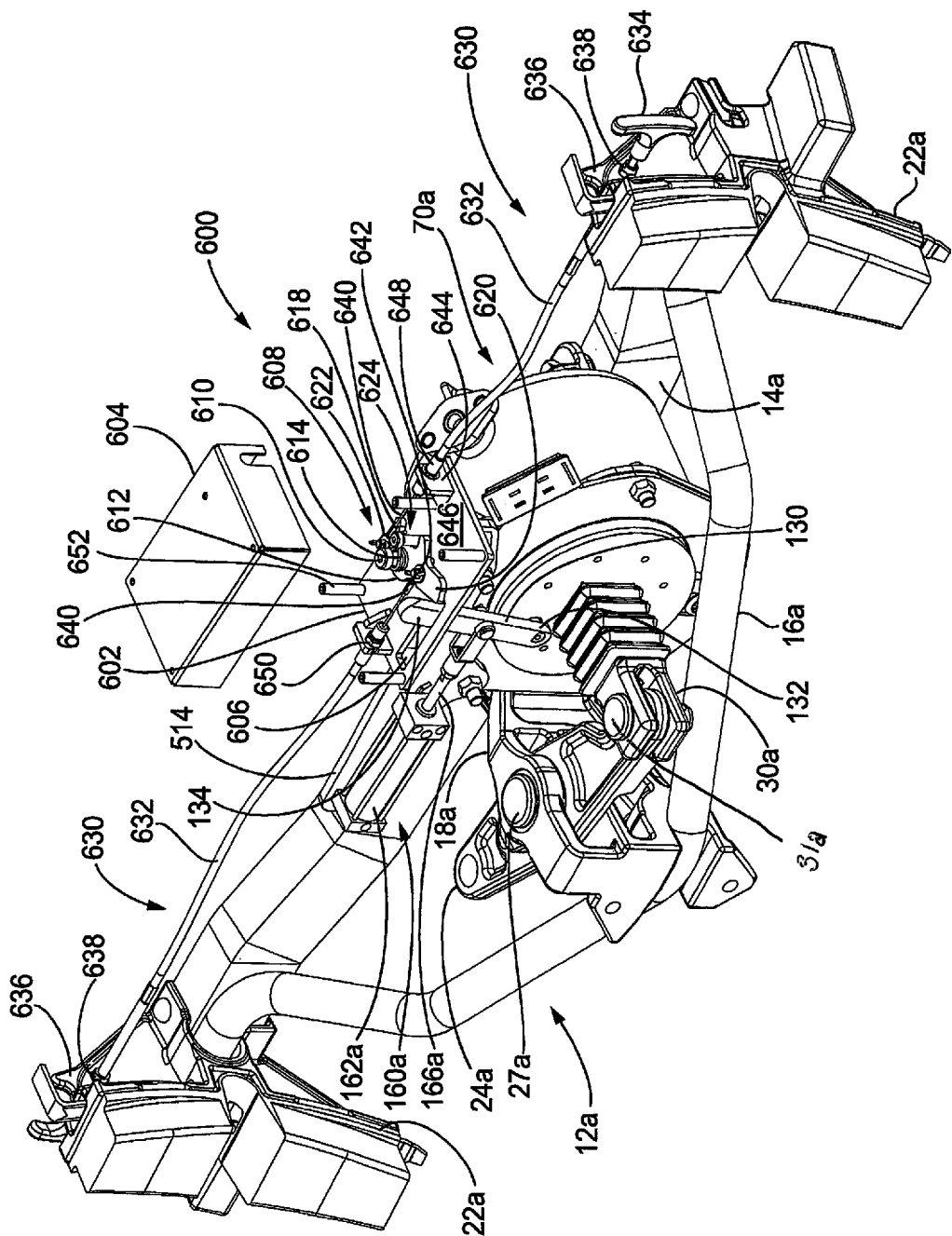
FIG. 18 is a perspective view of a braking rigging mounted within a truck apparatus of a railway vehicle and comprising a manually operated brake release mechanism.

Another embodiment of a brake rigging 10 is shown in FIG. 18 and, in a similar manner to the embodiment shown in FIGS. 1-3, comprises a brake beam 12a including a compression member 14a, a tension member 16a and a strut member 18a. The opposite ends of the compression member 14a and the tension member 16a may be permanently connected together in a conventional manner. Mounted on the respective ends of the brake beam 12a, are brake heads 22a. At a location approximately midway between their opposite ends, the compression member 14a and the tension member 16a of the brake beam 12a are spaced apart sufficiently to allow connection of a strut member 18a. A force transfer lever 24a is pivotally connected by a pin 27a to the strut member 18a. One end of the force transfer lever 24a is connected to a force-transmitting member (not shown), which may be in the form of an automatic slack adjuster device. The opposite end of the force transfer lever 24a is connected to the pressure head of a brake actuator 70a via the push rod 30a, discussed above, by a pin 31a.

As with the embodiment described previously in connection with FIGS. 7-9 and 11, a pneumatically operated cylinder 160a is provided. The pneumatically operated cylinder 160a is similar to the pneumatically operated cylinder 160 discussed previously. In the present embodiment the cylinder 160a is mounted on the brake actuator 70a, such as mounted on a mounting plate 514 secured on the brake actuator 70a, such as by threaded fasteners. The pneumatically operated cylinder 160a has a casing 162a, a piston assembly 164 (see FIG. 10), a piston rod 166a connected at a first end thereof to a first end of the piston assembly 164 and pivotally connected at a second end thereof to an approximate midpoint of the operating lever 130. As in previously described embodiments, such as shown in FIG. 8, the operating lever 130 has a first end 132 disposed on and secured to the second end 124 of shaft 120 for rotation therewith. Thus, the operating lever 130 is rotatable in a first rotational direction when the first rotational force is applied to a second end 134 thereof and is rotatable in the second rotational direction when a second, opposite rotational force is applied to the second end 134 thereof. A spring 168 (see FIG. 10) is caged within the casing 162a between an end thereof and the second end of the piston assembly 164. When installed within a railway car 2 (as shown in FIG. 1), the piston assembly 164 and piston rod 166a move in a direction which is generally perpendicular to the movement direction of the push rod 30a as well as to the rotational axis of the ratchet 114a and the holding pawl 128a, as shown for example, in FIGS. 13-17.

Referring to FIGS. 18-22, another embodiment of a manually operated parking brake release mechanism 600 is mechanically coupled to the pneumatically operated cylinder 160a for manually releasing the push rod 30a. The manually operated release mechanism 600 is supported by a mounting plate 602 secured on the top end of an actuator mounting plate 514. The mounting plate 602 may be enclosed by housing portion 604 to enclose the mechanical components of the manually operated release mechanism 600. The plate member 602 is secured onto the actuator mounting plate 514 supporting the pneumatically operated cylinder 160a. The plate member 602 defines an opening 606 to permit the second end 134 of the operating lever 130 to extend therethrough.

A spring-biased lever arm mechanism 608 is pivotally connected to the mounting plate 602 via a pivot pin 610 on the mounting plate 602. The lever arm mechanism 608 comprises a lever arm 612 pivotal mounted on the pivot pin 610, and further comprises a torsion spring 614 also disposed on the pivot pin 610. The torsion spring 614 has a terminal coil element 616 engaged with a limit pin 618 secured to the mounting plate 602. The torsion spring 614 has a second terminal coil element (not shown) engaged with lever arm 612, such that pivotal movement imparted to the lever arm 612 stores energy in the torsion spring 614, and release of the lever arm 612 releases the energy to return the lever arm 612 to a neutral position. The lever arm 612 comprises a front appendage portion 620 of sufficient length to engage the second end 134 of the operating lever 130, and a rear appendage portion 622. The lever arm 612 further defines a notch 624 defined between two notch elements 626, 628. The forwardly disposed notch element 626 engages the limit pin 618 to maintain the position of the lever arm 612 in the neutral position, while the rearwardly disposed notch element 628 engages the limit pin 618 when an associated cable release mechanism 630, as described hereinbelow, is actuated to prevent over-rotation of the lever arm 612.

Pivotal movement of the lever arm 612 may be accomplished from either side of brake beam 12a by respective cable release mechanisms 630, or first and second cable release mechanisms 630, which are of identical construction and operation, only differing in the location where the respective cable release mechanisms 630 attach to the lever arm 612. Each cable release mechanism 630 comprises a release cable 632 having an operator handle 634 attached to one end and having a second end secured to the lever arm 612. The release cable 632 passes through an opening (not shown) in an upstanding plate element 636 associated with or cast integral to brake head 22a. The operator handle 634 restrains the release cable 632 from being pulled through the plate element 636. A mounting bushing or like cylindrical structure (not shown) may be provided in the opening in the plate element 636 and secured therein in by mechanical fasteners 638, with the release cable 632 extending through the mounting bushing, etc.

An opposing terminal end 640 of the release cable 632 may be secured by a suitable mechanical fastener 642 to the lever arm 612. In the view depicted in FIG. 18, the right side cable release mechanism 630 has the terminal end 640 of the release cable 632 secured by the mechanical fastener 642 to the lever arm 612 at a position to the rear of or behind the pivot pin 610 on the rear appendage portion 622 of the lever arm 612. Also in the view depicted in FIG. 18, the left side cable release mechanism 630 has the terminal end 640 of the release cable 632 secured by the mechanical fastener 642 to the lever arm 612 at a position in front of the pivot pin 610 and adjacent the front appendage portion 620. The release cable 632 is supported proximally of the terminal end 640 by an upstanding element 644 associated with or integral to the upper face 646 of the mounting plate 602. The release cable 632 extends through a sleeve or like cylindrical structure 648 disposed within an opening (not shown) in the bracket 644 and secured in the opening in the element 644 by suitable mechanical fasteners 650. Support posts 652 may also be provided on the upper face 646 of the mounting plate 602, such as at the corners of the mounting plate 602, to support the housing portion 604 on the mounting plate 602.

Figure 19:
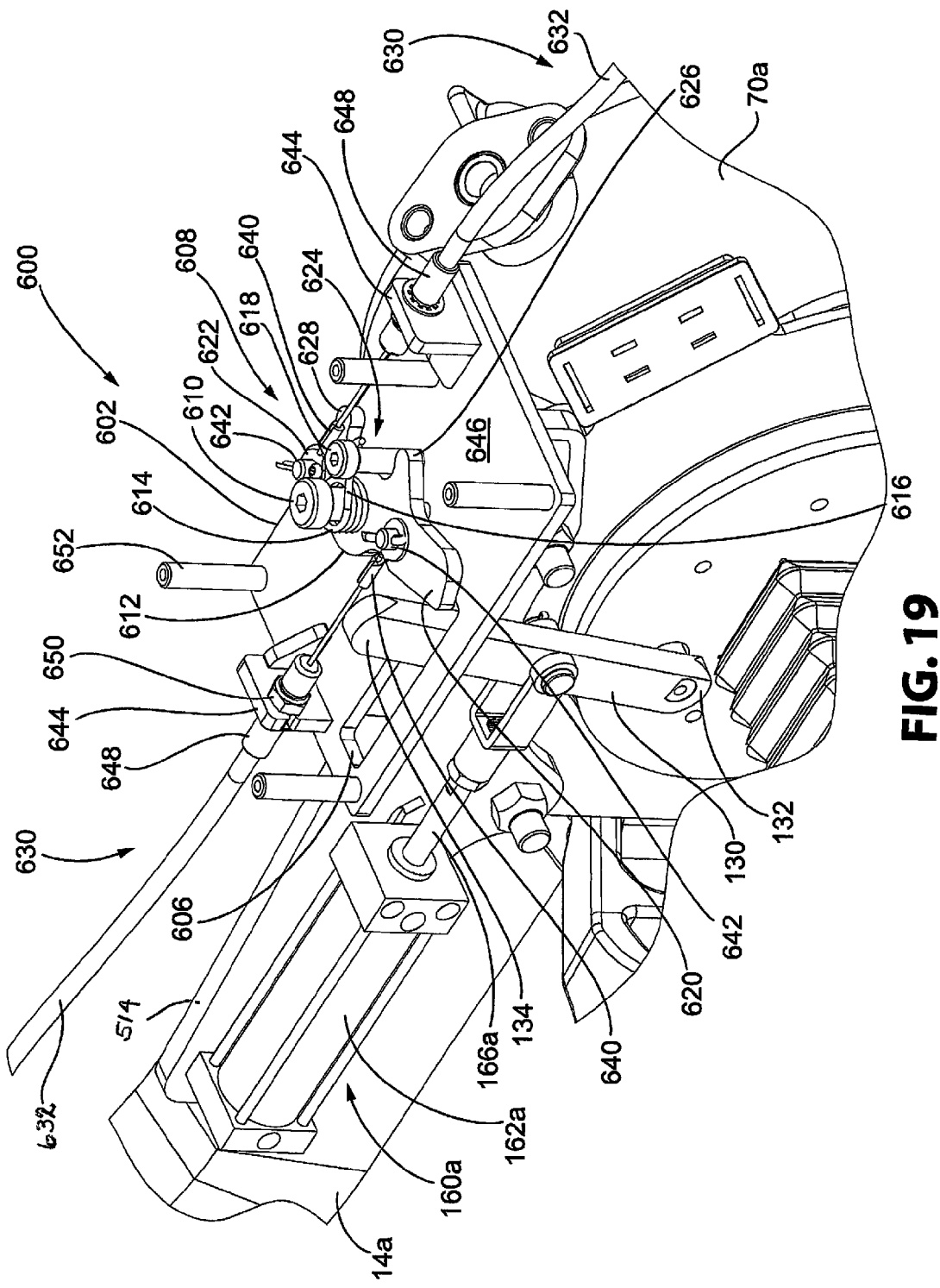
FIG. 19 is a perspective view of a portion of the manually operated brake release mechanism shown in FIG. 18.
Figure 22:
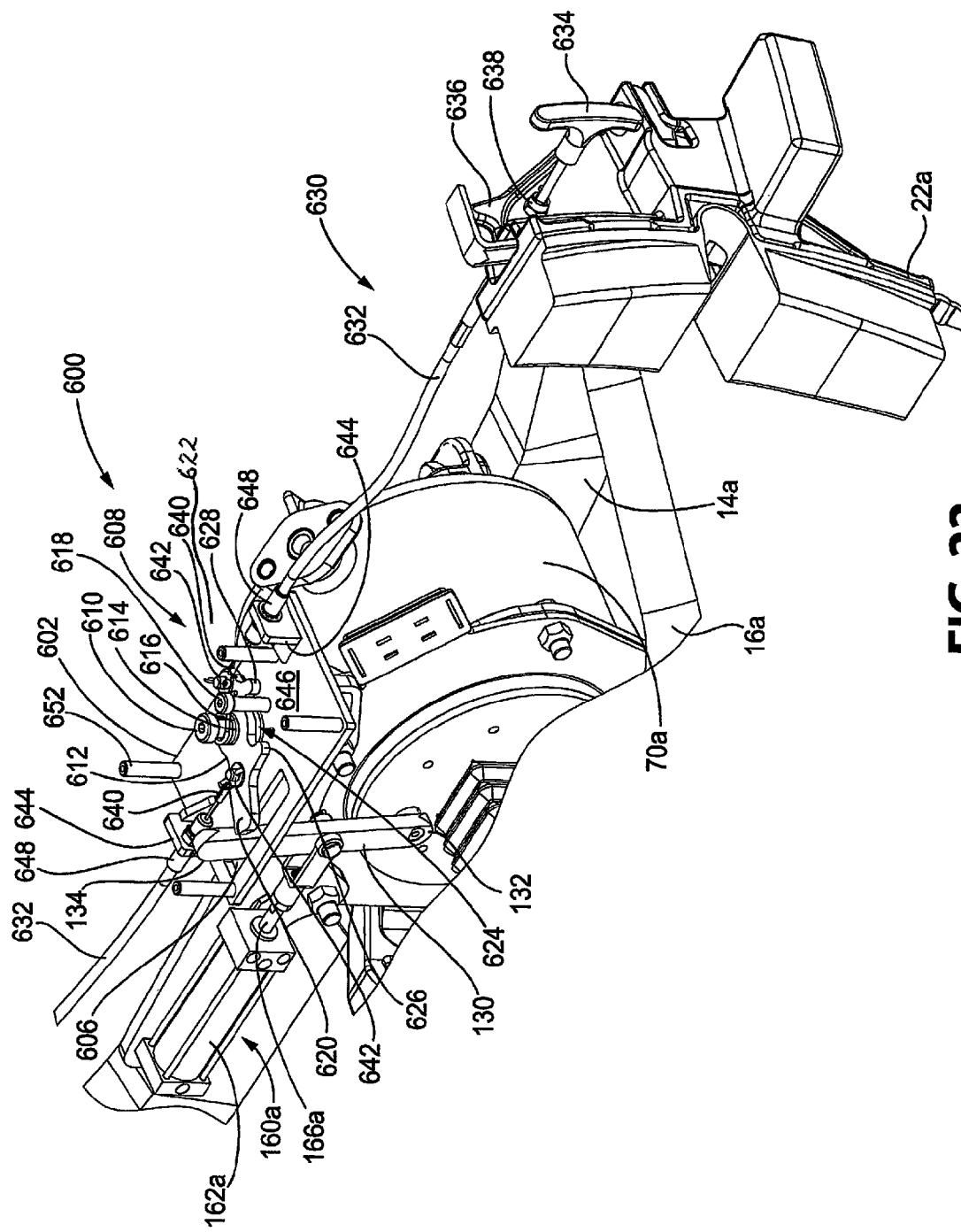
FIG. 22 is a perspective view showing operation of the manually operated brake release mechanism using the operator handle of FIG. 20.

In use, as shown in FIG. 22, when the first or right side operator handle 634 is pulled by an operator, the lever arm 612 pivots clockwise on pivot pin 610 and a rear appendage portion 622 pivots clockwise until the rear notch element 628 contacts the limit pin 618. This rotational motion stores energy in the torsion spring 614 due to interference engagement between terminal coil elements 616 of the torsion spring 614, lever arm 612, and the limit pin 618. As the lever arm 612 pivots on pivot pin 610, the front appendage portion 620 moves the operating lever 130, via contact engagement with the second end 134 of the operating lever 130, to move the operating lever 130 from a first position as shown in FIGS. 18-19 to a second position as shown in FIG. 22. Thus, the rotational movement of the operating lever 130 permits the holding pawl 128a to disengage the ratchet teeth of the ratchet 114a, such as shown in FIGS. 13-18 and discussed above, (see also the pawl 128 of FIGS. 8-9) and enable the push rod 30a to move due to extension of the spring 100 (see FIG. 8), thus releasing the applied braking force. Once the operator handle 634 is released, the stored energy in the torsion spring 614 returns the lever arm 612 to the neutral position, as shown in FIGS. 18-19, wherein the front notch element 626 reengages the limit pin 618, with the torsion spring 614 biasing the lever arm 612 in this engagement. The opposing, left-side cable release mechanism 630 in the respective views of FIGS. 18-22 operates in an analogous manner to the foregoing except that the force applied to the lever arm 612 is applied at a position in front of the pivot pin 610 and adjacent the front appendage portion 620 when the second or left side operator handle 634 is pulled by an operator, and the rear notch element 628 limits the rotational movement of the lever arm 612.

While embodiments of a bail compensating joint and a parking brake assembly for use in a railway vehicle truck mounted brake rigging and a manually operated release mechanism for use with a railway vehicle parking brake assembly are provided in the foregoing description, those skilled in the art may make modifications and alterations to these embodiments without departing from the scope and spirit of the invention. Accordingly, the foregoing description is intended to be illustrative rather than restrictive.

The invention claimed is:

1. A spring-biased lever arm mechanism for operating an operating lever of a parking brake release mechanism, comprising:
   a lever arm mounted on a pivot pin, said lever arm comprising a front appendage portion in engagement with the operating lever, a rear appendage portion, and a notch defined in one side of the lever arm between a pair of notch elements;
   a torsion spring disposed on the pivot pin;
   a first cable release mechanism comprising a first release cable having one terminal end with a first operator handle connected thereto and an opposing terminal end connected to the lever arm proximal of the front appendage portion; and
   a second cable release mechanism comprising a second release cable having one terminal end with a second operator handle connected thereto and an opposing terminal end connected to the rear appendage portion of the lever arm,
   wherein application of a pulling force to the first operator handle or the second operator handle causes pivotal movement of the lever arm on the pivot pin and stores energy in the torsion spring, and release of the first operator handle or the second operator handle automatically returns the lever arm to a neutral position.

2. The spring-biased lever arm mechanism of claim 1, wherein the pivot pin is mounted on a mounting plate.

3. The spring-biased lever arm mechanism of claim 2, further comprising a limit pin mounted on the mounting plate, and wherein the torsion spring comprises at least one terminal coil element in interference engagement with at least one of the limit pin and lever arm.

4. The spring-biased lever arm mechanism of claim 3, wherein the limit pin is disposed within the notch in the lever arm and the notch elements limit rotational motion of the lever arm.

5. A manually operated parking brake release mechanism for a railway vehicle, comprising:
   a brake actuator;

an operating lever operatively connected to the brake actuator to manually release an applied braking force; and a spring-biased lever arm mechanism for operating the operating lever, comprising:
  a lever arm mounted on a pivot pin and comprising a front appendage portion in engagement with the operating lever, a rear appendage portion, and a notch defined in one side of the lever arm between a pair of notch elements;
  a torsion spring disposed on the pivot pin;
  a first cable release mechanism comprising a first release cable having one terminal end with a first operator handle connected thereto and an opposing terminal end connected to the lever arm proximal of the front appendage portion; and
  a second release mechanism comprising a second release cable having one terminal end with a second operator handle connected thereto and an opposing terminal end connected to the rear appendage portion of the lever arm,
  wherein application of a pulling force to the first operator handle or the second operator handle causes pivotal movement of the lever arm on the pivot pin and stores energy in the torsion spring to manually release the applied braking force, and release of the first operator handle or the second operator handle automatically returns the lever arm to a neutral position.

6. The manually operated parking brake release mechanism of claim 5, wherein the pivot pin is mounted on a mounting plate.

7. The manually operated parking brake release mechanism of claim 6, further comprising a limit pin mounted on the mounting plate, and wherein the torsion spring comprises at least one terminal coil element in interference engagement with at least one of the limit pin and lever arm.

8. The manually operated parking brake release mechanism of claim 7, wherein the limit pin is disposed within the notch in the lever arm and the notch elements limit rotational motion of the lever arm.

9. The manually operated parking brake release mechanism of claim 5, wherein pivotal movement of the lever arm causes the operating lever to rotate between a first position and a second position wherein rotational movement of the lever arm results in a release of the applied braking force.

10. The manually operated parking brake release mechanism of claim 9, wherein release of the first operator handle or the second operator handle enables stored energy in the torsion spring to return the lever arm to the neutral position and to cause the operating lever to rotate from the second position to the first position.

11. A spring-biased lever arm mechanism for operating an operating lever of a parking brake release mechanism, comprising:
  a lever arm mounted on a pivot pin, said lever arm comprising a front appendage portion in engagement with the operating lever;
  a torsion spring disposed on the pivot pin; and
  at least one cable release mechanism associated with the lever arm proximal of the front appendage portion,
  wherein application of a pulling force to the at least one cable release mechanism causes pivotal movement of the lever arm on the pivot pin and stores energy in the torsion spring, and release of the at least one cable release mechanism automatically returns the lever arm to a neutral position, and
  wherein the lever arm includes a rear appendage portion and the at least one cable release mechanism comprises a first cable release mechanism associated with the lever arm proximal of the front appendage portion and a second cable release mechanism associated with the rear appendage portion of the lever arm.

12. The spring-biased lever arm mechanism of claim 11, wherein the at least one cable release mechanism comprises a release cable having one terminal end with a first operator handle connected thereto and an opposing terminal end connected to the lever arm proximal of the front appendage portion.

13. The spring-biased lever arm mechanism of claim 12, wherein the one terminal end of the release cable secured to the first operator handle is supported by an upstanding element associated with an upper face of a mounting plate and the opposing terminal end is secured to the lever arm with a mechanical fastener.

14. The spring-biased lever arm mechanism of claim 11, wherein the first cable release mechanism comprises a first release cable having one terminal end with a first operator handle connected thereto and an opposing terminal end connected to the lever arm proximal of the front appendage portion and the second cable release mechanism comprises a second release cable having one terminal end with a second operator handle connected thereto and an opposing terminal end connected to the rear appendage portion of the lever arm.

15. The spring-biased lever arm mechanism of claim 11, wherein application of the pulling force can be applied to either the first cable release mechanism or the second cable release mechanism to cause pivotal movement of the lever arm and manually release the parking brake.

16. A spring-biased lever arm mechanism for operating an operating lever of a parking brake release mechanism, comprising:
  a lever arm mounted on a pivot pin, said lever arm comprising a front appendage portion in engagement with the operating lever;
  a torsion spring disposed on the pivot pin; and
  at least one cable release mechanism associated with the lever arm proximal of the front appendage portion,
  wherein application of a pulling force to the at least one cable release mechanism causes pivotal movement of the lever arm on the pivot pin and stores energy in the torsion spring, and release of the at least one cable release mechanism automatically returns the lever arm to a neutral position, and
  wherein the lever arm includes a pair of notch elements defining a notch therebetween.

17. The spring-biased lever arm mechanism of claim 16, wherein the pivot pin is mounted on a mounting plate.

18. The spring-biased lever arm mechanism of claim 17, further comprising a limit pin mounted on the mounting plate, and wherein the torsion spring comprises at least one terminal coil element in interference engagement with at least one of the limit pin and lever arm.

19. The spring-biased lever arm mechanism of claim 18, wherein the limit pin is disposed within the notch in the lever arm and the notch elements limit rotational motion of the lever arm.

\* \* \* \* \*